US006737571B2

(12) United States Patent
Furukawa

(10) Patent No.: US 6,737,571 B2

(45) Date of Patent: May 18, 2004

(54) MUSIC RECORDER AND MUSIC PLAYER FOR ENSEMBLE ON THE BASIS OF DIFFERENT SORTS OF MUSIC DATA

(75) Inventor: Rei Furukawa, Hamamatsu (JP)

(73) Assignee: Yamaha Corporation, Hamamatsu (JP)

(*) Notice: Subject to any disclaimer, the term of this patent is extended or adjusted under 35 U.S.C. 154(b) by 0 days.

(21) Appl. No.: 10/304,034

(22) Filed: Nov. 25, 2002

(65) Prior Publication Data

US 2003/0101862 A1 Jun. 5, 2003

(30) Foreign Application Priority Data

Nov. 30, 2001 (JP) ........................................ 2001-367316
Jan. 16, 2002 (JP) ........................................ 2002-007872
Jan. 16, 2002 (JP) ........................................ 2002-007873

(51) Int. Cl.[7] .............................. G01H 1/36; G01H 7/00

(52) U.S. Cl. .............................................. 84/610; 84/645

(58) Field of Search .......................... 84/600, 609, 610, 84/645, 649, 2–5

(56) References Cited

U.S. PATENT DOCUMENTS 4,744,281 A 5/1988 Isozaki
5,189,237 A 2/1993 Loguchi
5,648,621 A * 7/1997 Sasaki .......................... 84/171
5,652,403 A 7/1997 Sugiyama et al.
5,902,949 A * 5/1999 Mohrbacher ................. 84/609
6,143,973 A 11/2000 Kikichi
6,160,213 A 12/2000 Arnold et al.
6,281,424 B1 * 8/2001 Koike et al. .................. 84/636
6,489,549 B2 * 12/2002 Schmitz et al. ............... 84/609
6,600,097 B2 * 7/2003 Shiiya .......................... 84/609
2001/0007220 A1 7/2001 Koseki et al.

FOREIGN PATENT DOCUMENTS

EP 1 103 973 5/2001

* cited by examiner

*Primary Examiner*—Jeffrey Donels
(74) *Attorney, Agent, or Firm*—Morrison & Foerster LLP

(57) ABSTRACT

A music player/recorder includes two data sources, a controlling system and two sound source or a recording system; one of the two data sources supplies event codes representative of first tones and delta-time codes representative of time intervals between the events as defined in the MIDI standards to the controlling system, and the other data source supplies audio data codes representative of second tones and time codes representative of a lapse of time to the controlling system; the controlling system counts tempo clocks, and converts the number of tempo clocks to a reference lapse of time to see whether or not the difference between the lapse of time and the reference lapse of time is ignoreable; when the answer is given negative, the controlling system varies the time interval so that the first tone is produced synchronously with the corresponding second tone.

22 Claims, 19 Drawing Sheets

MUSIC RECORDER AND MUSIC PLAYER FOR ENSEMBLE ON THE BASIS OF DIFFERENT SORTS OF MUSIC DATA

FIELD OF THE INVENTION

This invention relates to a music recorder and a music player and, more particularly, to a music recorder and music player for ensemble between different sorts of sound sources.

DESCRIPTION OF THE RELATED ART

Pieces of music are stored in information storage media on the basis of different formulae. Compact discs are a typical example of the music data information storage media. However, the meaning of the pieces of data is not same. Binary codes in a compact disc are representative of the amplitude of an analog signal representative of music sound. The analog signal is periodically sampled at 44.1 kHz, and binary codes are successively assigned to the discrete values. Thus, the analog signal is quantized, and the discrete values of the amplitude are stored in the compact discs in the form of digital codes. The discrete values of the amplitude are hereinbelow referred to as "time series audio data", and the digital codes representative of the time series audio data are referred to as "audio data codes".

The MIDI (Musical Instrument Digital Interface) standards give another formula to digital codes stored in compact discs or floppy discs. The digital codes represent events at which each tone is generated or decayed and time intervals between the events. The digital codes thus formulated are hereinbelow referred to as "MIDI codes". Pieces of information relating to the events and pieces of information relating to the time intervals are referred to as "event data" and "duration data", respectively, and the digital codes representative of the event data and the digital codes representative of the duration data are referred to as "event codes" and "delta-time codes", respectively.

Music players try to make ensembles with pieces of music reproduced from the time series audio data recorded in the compact discs. Other music players want to record his or her performance in the form of MIDI codes together with the time series audio data. FIG. 1 shows a prior art music recorder/player 100, and the prior art music recorder/player 100 comprises a compact disc player 200, a MIDI code generator 400 and a recorder/reproducer 500. A compact disc CD is to be loaded in the compact disc player 200, and the MIDI code generator 400 is incorporated in a musical instrument 300 such as a piano.

The compact disc player 200 is equipped with an optical head, and reads out the audio data codes from the compact disc CD. Pieces of music are usually stored in compact discs in a digital stereo signal. The compact disc player converts the digital stereo signal to a digital monoral audio signal, and supplies the digital monoral audio signal representative of the time series audio data to the recorder/reproducer 500 as a signal to be stored in the left channel L. On the other hand, while the user is playing the musical instrument 300, the MIDI code generator 400 monitors the fingering on the musical instrument, and discriminates depressed/released keys from the other keys. The MIDI code generator 400 determines the events, and produces the event codes and delta-time codes representative of the performance. The MIDI code generator 400 supplies a digital MIDI data signal to the recorder/reproducer 500 as a signal to the stored in the right channel R.

The recorder 500 writes the monoral audio data codes and the MIDI codes in the left and right channels of an information storage medium such as a compact disc-recordable. When the user wants to reproduce the performance, the user instructs the prior art music recorder/player to reproduce the ensemble, the recorder/reproducer 500 concurrently reads out the digital monoral audio data codes from the left channel and the MIDI codes from the right channel, and supplies the digital monoral audio data codes and the MIDI codes to the compact disc player 200 and a tone generator/sound system (not shown), respectively. The compact disc player 200 produces monoral sound from the digital monoral audio data codes, and the tone generator/sound system produces electronic tones from the MIDI codes. Thus, the electronic tones and monoral sound are reproduced asynchronously with each other.

The first problem inherent in the prior art music recorder/player is the asynchronously recorded digital codes. If the user temporarily fingers his or her part out of rhythm with the compact disc player 200, the prior art music recorder/player faithfully records and reproduces his or her part out of the rhythm with the other part.

Another problem is the monoral sound. Even though the other part was recorded in the compact disc as the stereo sound, the other part is reproduced as the monoral sound. Thus, the sound quality is degraded through the prior art music recorder/player.

In case where a user wants to make a compact disc player perform ensemble with a MIDI sound reproducer, which reads out MIDI codes from a floppy disc, there is no way to make electronic tones reproduced synchronously with the stereo sound. In detail, the time series audio data are expressed with the audio data codes D1 and time codes D2 (see FIG. 2A), and the MIDI data are expressed with the event codes D3 and delta-time codes D4 as shown in FIG. 2B. An example of the event codes is shown in FIG. 2C, and represents a note-on or note-off, a note number assigned to the tone to be generated or decayed and a velocity of the tone. The time codes D2 represent a lapse of time from the initiation of the performance recorded in the compact disc. A time code D2 is always larger in value than the time code D2 on the left side thereof. On the other hand, the delta time codes D4, i.e., Δt codes, are representative of time interval between two events. The leftmost delta time code D4 is indicative of the time interval between the event expressed by the leftmost event data codes D3 and the next event expressed by the event codes D3 on the right side thereof. When two events concurrently take place, the event codes D3 are followed by other event codes D3 as indicated by the middle two boxes in FIG. 2B.

Although both of the time series audio data and the MIDI data contain pieces of timing information for the tones to be produced, the pieces of timing data are different in meaning between the time series audio data and the MIDI data. For this reason, even if the time codes D2 are compared with the corresponding delta time codes D4, the comparison is nonsense, and any synchronization is hardly established between the compact disc player and the tone generator/sound system.

A controller is assumed to process the time series audio data codes and the MIDI codes in parallel. The events, i.e., the note-on events and note-off events tend to take place ahead of or late for the tones to be concurrently generated. This is because of the fact that it is impossible to make the clock signal used in the controller strictly equal to the sampling clock frequency, i.e., 44.1 kHz as well as the clock signal used in the MIDI code generator.

SUMMARY OF THE INVENTION

It is therefore an important object of the present invention to provide a synchronous music player, which establishes synchronization between plural sound sources for ensemble in a real time fashion on the basis of plural sorts of music data.

It is also an important object of the present invention to provide a synchronous music recorder, which records a sort of music data produced synchronously with another sort of music data in a real time fashion.

To accomplish the object, the present invention proposes to measure a reference lapse of time on which time intervals are defined, comparing the reference lapse of time with a lapse of time to see whether or not the difference is ignoreable and varying the time intervals for regulating timing at which the corresponding pieces of first musical data information are supplied to a destination such as, for example, a first sound source or a recording system.

In accordance with one aspect of the present invention, there is provided a music player for producing first sorts of sound and second sorts of sound synchronously with one another comprising a first data source outputting a first sort of music data containing pieces of first music data information representative of first tones and pieces of first time data information each representative of a time interval between one of the pieces of first time data information and the next piece of first time data information, a second data source outputting a second sort of music data containing pieces of second music data information representative of second tones and pieces of second time data information each representative of a lapse of time from a starting point, a controlling system connected to the first data source and the second data source, producing a reference scale on which one of the lapse of time and the time interval is defined, the reference scale being identical in meaning with the other of the lapse of time and the time interval, the controlling system comparing the other of the lapse of time and the time interval with the reference scale to see whether or not a difference therebetween is ignoreable, varying the aforesaid one of the lapse of time and the time interval or the reference scale when the answer is given negative, outputting the associated one of the piece of first music data information and the piece of the second music data information upon expiry of the aforesaid one of the lapse of time and the time interval varied or unvaried after the comparison between the other of the lapse of time and the time interval and the reference scale and further outputting the other of the piece of first music data information and the piece of second music data information, a first sound source connected to the controlling system and supplied with the pieces of first music data information for producing the first tones, and a second sound source connected to the controlling system and supplied with the pieces of second music data information for producing the second tones.

In accordance with another aspect of the present invention, there is provided music recorder for recording a first sort of music data in an information storage medium comprising a first data source outputting the first sort of music data containing pieces of first music data information representative of first tones, a time interval between each of the pieces of first music data information and the next piece of first music data information being to be defined in one of pieces of first time data information, a second data source outputting a second sort of music data containing pieces of second music data information representative of second tones and pieces of second time data information each representative of a lapse of time from a starting point, a controlling system connected to the first data source and the second data source, measuring a reference lapse of time on which the time intervals are to be defined, holding a value of the reference lapse of time when the aforesaid one of the pieces of first music data information reached there, calculating the time interval when the next piece of first music data information reaches there, comparing the lapse of time with the reference lapse of time to see whether or not a difference therebetween is ignoreable, varying one of the reference lapse of time and the time interval so as to minimize the difference when the answer is given negative and outputting the piece of first music data information and the associated piece of first time data information, and a recording system connected to the controlling system, and recording the pieces of first music data information and the associated pieces of first time data information in an information storage medium.

BRIEF DESCRIPTION OF THE DRAWINGS

The features and advantages of the synchronous music player and synchronous music recorder will be more clearly understood from the following description taken in conjunction with the accompanying drawings, in which FIG. 10 is a view showing the file structure of a standard MIDI file.

DESCRIPTION OF THE PREFERRED EMBODIMENTS

Music Player

Figure 1:
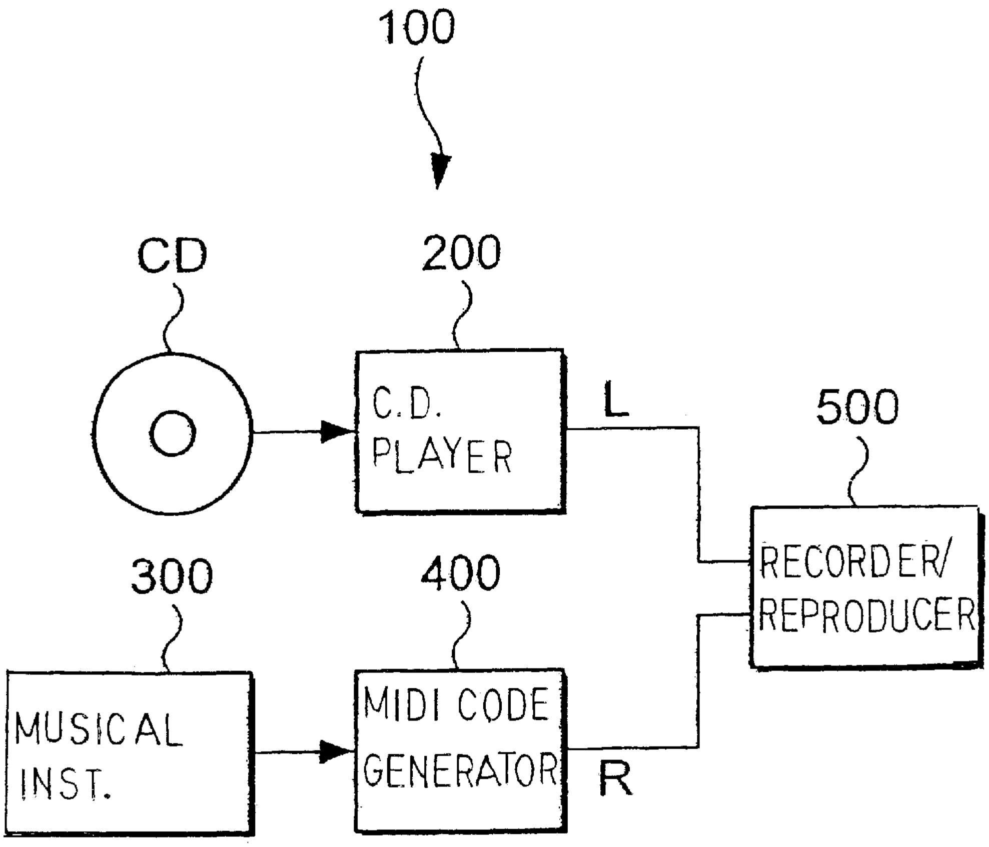
Fig. 1 PRIOR ART
FIG. 1 is a block diagram showing the configuration of the prior art music recorder/player.

A music player according to the present invention comprises a first data source, a second data source, a first sound source, a second sound source and a controlling system. The first data source and second data source are connected to the controlling system in parallel, and supplies a first sort of music data and a second sort of music data to the controlling system. The first sort of music data contains piece of first time data information representative of time intervals between pieces of first music data information representative of first tones to be produced through the first sound source. The second sort of music data contains pieces of second time data information representative of the lapse of time along which second tones are to be produced on the basis of pieces of second music data information. The first sound source and second sound source are connected in parallel to the controlling system, and produces the first tones and second tones on the basis of the pieces of first music data information and the pieces of second music data information, respectively.

When the music player starts a playback for an ensemble between the first sound source and second sound source, the first data source and second data source are supplying the first sort of music data and second sort of music data to the controlling system, and the controlling system regulates the timing at which each piece of first music data information is supplied to the first sound source as follows. In detail, the controlling system sequentially supplies the pieces of second music data information to the second sound source, and the second sound source produces the second tones from the pieces of second music data information.

The controlling system sequentially supplies the pieces of second music data information to the second sound source, and the second sound source produces the second tones from the pieces of second music data information. The controlling system measures a reference lapse of time on which the time intervals are determined. The controlling system compares the lapse of time with the reference lapse of time to see whether or not the difference therebetween is ignoreable.

If the answer is given affirmative, the controlling system supplies a corresponding piece of first music data information to the first sound source upon expiry of the time interval represented by the corresponding piece of first time data information, and the first sound source produces the first tone on the basis of the corresponding piece of first music data information.

If the answer is given negative, the controlling system increases or decreases the time interval represented by the piece of first time data information, and supplies the corresponding piece of first music data information to the first sound source upon expiry of the modified time interval, and the first sound source produces the first tone on the basis of the piece of first music data information.

Thus, the dial plate for the pieces of first time data information is periodically adjusted to the dial plate for the pieces of second time data information so that the pieces of first music data information are supplied to the first sound source synchronously with the corresponding pieces of second music data information supplied to the second sound source. For this reason, the first tones are generated concurrently with the corresponding second tones, and the music player accomplishes the playback of the ensemble.

In another music player, reference time intervals may be determined on the basis of the pieces of second time data representative of the lapse of time. In this instance, the controlling system compares each time interval with the corresponding reference time interval for regulating the pieces of second time data information.

First Embodiment

Figure 2A:
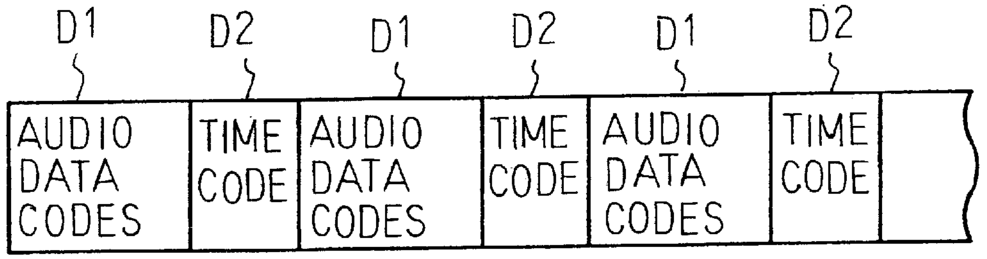
Fig. 2 A PRIOR ART
FIGS. 2A, 2B and 2C are views showing the arrangement of the time series audio data codes, the arrangement of MIDI codes and the example of event.
Figure 2B:
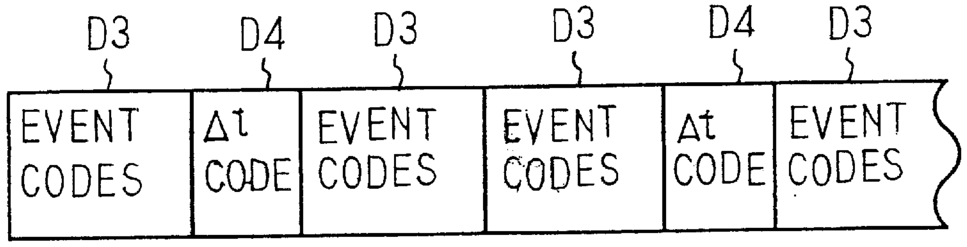
Fig. 2 B PRIOR ART
Figure 2C:
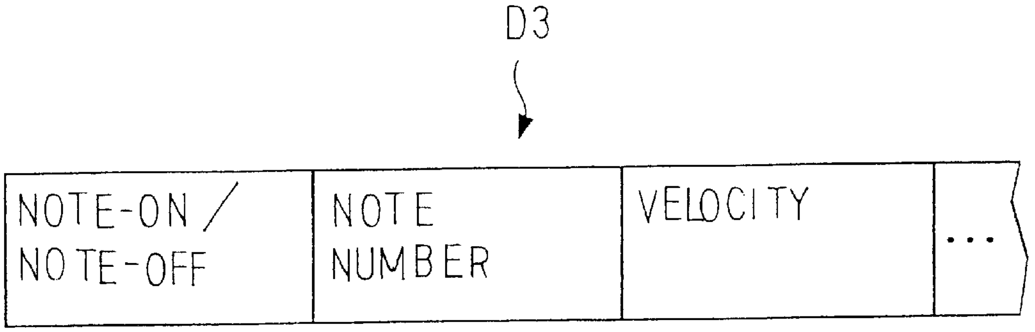
Fig. 2 C PRIOR ART
Figure 1:
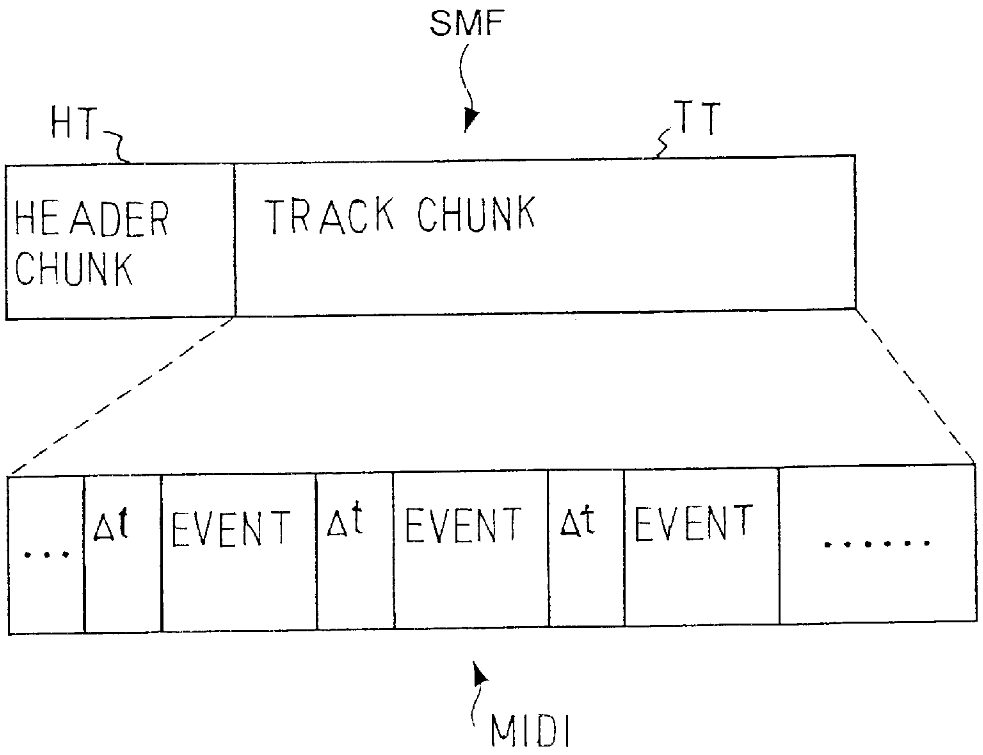
Fig. 1 0 PRIOR ART
Figure 3:
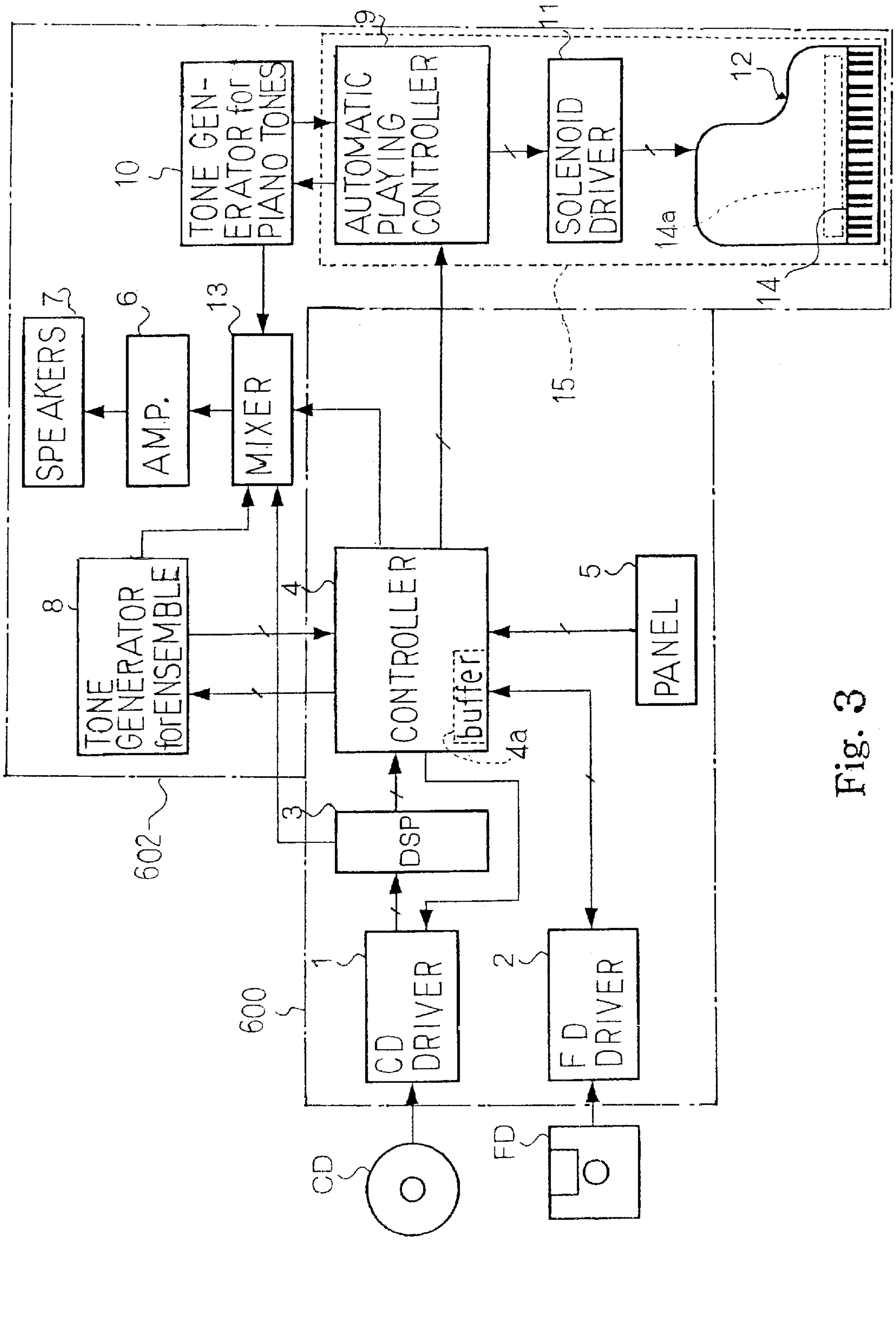
FIG. 3 is a block diagram showing the system configuration of a music player according to the present invention.

Referring to FIG. 3 of the drawings, a music player embodying the present invention largely comprises a controlling system 600 and a sound source 602. The sound source 602 has plural sound generators as will be described hereinafter in detail. The controlling system 600 synchronously reads out time series audio data and MIDI data, both of which are in the form of digital codes, from external data sources CD/FD, and transfers the digital codes to the sound source 602. In this instance, the external data sources are a compact disc CD and a floppy disc FD. Audio data codes D1 and time codes D2 express the time series audio data as shown in FIG. 2A, and event codes D3 and delta time codes D4 represent the MIDI data as shown in FIG. 2B. An event code D3 is representative of initiation of reading out the time series audio data, and is labeled with "D3*a*" in the following description. The audio data codes are selectively assigned the left channel and right channel, and stereo sound is reproduced from the audio data codes. A compact disc may store a series of audio codes for one of the left and right channels and a set of MIDI codes in the other of the left and right channels. The controlling system 600 achieves two major tasks. One of the major tasks is to establish synchronization between the external data source of the audio codes and another external data source of the MIDI codes. Another major task is to selectively transfer the audio/event codes to the sound source 602.

The sound source 602 includes plural sound generators, and selected one or ones of the plural sound generators reproduce tones in solo or ensemble on the basis of the audio data codes and the event codes. The plural sound generators reproduces the tones acoustically and/or electronically. In this instance, one of the plural sound generators reproduces acoustic tones, and another of the plural sound generators reproduces electronic tones.

The controlling system 600 includes a compact disc driver 1, a floppy disc driver 2, a digital signal processor 3, a controller 4 and a manipulating panel 5. The digital signal processor 3 is abbreviated as "DSP" in FIG. 3. The controller 3 has an information processing capability. The compact disc driver 1 is a general purpose compact disc driver. In other words, the compact disc driver 1 is not exclusively used for music. On the other hand, the floppy disc driver 2 is designed for the music player, and has an information processing capability. The floppy disc driver 2 serves as not only a sequencer but also a timing controller. A clock generator 201 is incorporated in the controller 4 (see FIG. 4). The clock generator 201 includes a quartz oscillator, an amplifier and a frequency divider. The quartz oscillator generates an oscillation signal, and the oscillation signal is amplified by the amplifier. The oscillation signal is supplied from the amplifier to the frequency divider, and plural clock signals, which are different in frequency from one another, are output from the clock generator 201. One of the clock signals is referred to as "tempo clock signal", and is labeled with "CT" in FIG. 4.

Turning back to FIG. 3, the sound source 602 includes an amplifier 6, speakers 7, a tone generator for ensembles 8, an automatic playing controller 9, a tone generator for piano tones 10, a solenoid driver 11 and an acoustic piano 12. The acoustic piano 12 has a keyboard 14 and pedals, and solenoid-operated key actuators 14*a* are provided beneath the keyboard 14 and in association with the pedals. The solenoid driver 11 is connected to the solenoid-operated key/pedal actuators 14*a*, and selectively energizes the solenoids-operated key/pedal actuators 14*a* for moving the keys and/or pedals without any fingering and stepping. The automatic playing controller 9, the solenoid driver 11 and the acoustic piano 12 as a whole constitute an automatic player piano 15. The event codes D3 are selectively supplied from the controller 4 to the automatic playing controller 9 and the tone generator 8 for ensembles, and an analog audio signal is supplied from the digital signal processor 3 and the controller 4 to the mixer 13. Those system components will be hereinbelow described in more detail.

The compact disc driver 1 has a signal input port and a signal output port. The compact disc driver 1 is connected through the signal output port to the digital signal processor 3, and receives a control signal from the controller 4 at the signal input port. The control signal is representative of the initiation of reading out the time series audio data. The compact disc driver 1 is connected through the signal output port to the digital signal processor 3, and supplies the audio data codes D1 and time codes D2 to the digital signal processor 3. When the control signal arrives at the compact disc driver 1, the compact disc driver 1 sequentially reads out the audio data codes D1 and time codes D2 from the compact disc CD, and supplies the audio data codes D1 and time codes D2 to the digital signal processor 3.

The floppy disc driver 2 has a signal port, which is connected to the controller 4. The floppy disc controller 2 is expected to achieve three major tasks, and serve as a sequencer, a data converter and a timing regulator. The controller 4 supplies a control signal representative of the initiation of reading out the MIDI codes to the floppy disc driver 2, and the floppy disc driver 2 is responsive to the control signal for initiating the data read-out. The floppy disc driver 2 reads out an event code or a group of event codes from the floppy disc FD, and supplies the event code or codes D3 to the controller 4. The delta time code D4 follows the event code or codes D3. The floppy disc driver 2 determines a time period until the next data read-out, and stands idle over the time period. Upon expiry of the time period, the floppy disc driver 2 reads out the next event code or codes D3. Thus, the floppy disc driver 2 serves as the sequencer.

As described hereinbefore, the event code D3*a* is representative of the initiation of reading out the time series audio data, and is located at the position equivalent to 250 millisecond later than the initiation of the reading out the MIDI codes. When the event code D3*a* is read out from the floppy disc FD, the floppy disc driver 2 supplies the event code D3*a* to the controller 4. The controller 4 interprets the event code D3*a*, and acknowledges the timing at which the compact disc driver 1 starts the data read-out. Then, the controller 4 supplies the control signal representative of the initiation of reading out the time series audio data to the compact disc driver 1.

Another major task to be achieved by the floppy disc driver 2 is to convert time intervals to a lapse of time in a real time fashion. In other words, the floppy disc driver 2 converts the delta-time codes D3 to a series of time codes D2.

Yet another task to be achieved by the floppy disc driver 2 is to regulate the timing at which the floppy disc driver 2 transfers the event code or codes D3 to the controller 4. This means that the floppy disc controller 2 can vary the time interval between the event codes D3. The function of the timing regulator will be described hereinafter in detail.

The digital signal processor 3 has a signal input port and signal output ports. The signal input port is connected to the signal output port of the compact disc driver 1, and the signal output ports are connected to the controller 4 and the mixer 13, respectively. The digital signal processor 3 achieves several major tasks. First, the digital signal processor 3 introduces a delay of 250 milliseconds into the propagation of the audio data codes and time codes D1/D2 from the compact disc driver 1 to the controller 4. Another major task is to determine the sort of data codes supplied from the compact disc driver 1. When a data code arrives at the digital signal processor 3, the digital signal processor 3 analyzes the data codes, and determines the sort of data codes. The digital signal processor 3 supplies a control signal representative of the sort of data code to the controller 4. Yet another major task is to produce an analog audio signal from the audio data codes D1, and supplies the analog audio signal to the mixer 13. The digital signal processor 3 introduces the delay of 250 milliseconds between the reception of the audio data codes D1 and the transmission of the corresponding parts of the analog audio signal for an ensemble.

The manipulating panel 5 is connected to the controller 4, and has plural switches, indicators and a display window. One of the switches is a power switch. When the power switch is manipulated, the music player is energized, or the electric power is removed therefrom. Another switch is used for specifying the modes of operation, i.e., an ensemble mode or a single playback mode, and yet another switch is used for specifying the sound generator or generators. Users selectively manipulate the switches for giving their instructions to the music player. The music player notifies the users of the current state, mode and pieces of information such as the lapse of time from the initiation of playback through the indicators and display window.

The controller 4 has signal input ports, which are connected to the digital signal processor 3, floppy disc driver 2, manipulating panel 5 and tone generator for ensembles 8 The signal input port assigned to the floppy disc controller 2 is connected to a tri-state buffer 4*a*. While the tri-state buffer 4*a* is staying in high-impedance state, the event code D3 is not latched by the buffer 4*a*. However, when an enable signal is changed to an active level, the tri-state buffer 4*a* is changed to enable state, and the event code D3 is latched by the tri-state buffer 4*a*. The controller 4 further has signal output ports, which are connected to the compact disc driver 1, floppy disc driver 2, tone generator for ensembles 8, automatic playing controller 9 and mixer 13. The controller 4 communicates with these system components 1–3, 5, 8, 9 and 13, and accomplishes the following major tasks.

The first major task is to interpret user's instructions. Users give instructions to the manipulating panel 5, and instruction signals are supplied from the manipulating panel 5 to the controller 4. The controller 4 analyzes the instruction signal, and determines the major task to be achieved.

The second major task is to make the audio data codes and MIDI data codes synchronously read out from the compact disc CS and floppy disc CD. When a user instructs the music player to reproduce an ensemble through the manipulating panel 5, the user manipulates the switch for the mode of operation. The manipulating panel 5 supplies the instruction signal representative of the ensemble mode, and the controller 4 acknowledges that the second major task is requested. The controller 4 supplies the floppy disc driver 2 the control signal representative of the initiation of reading out the MIDI codes. The floppy disc driver 2 sequentially reads out the MIDI codes D3/D4, and transfers the event codes D3 to the controller 4. The controller 4 checks every event code D3 to see whether or not the event code D3 is representative of a piece of music data or the initiation of reading out the time series audio data. When the controller 4 acknowledges that the event code D3 is representative of a piece of music data, the controller 4 supplies the event code D3 to the automatic playing controller 9. On the other hand, when the controller 4 finds the event code D3*a* to be representative of the initiation of reading out the time series audio data, the controller 4 supplies the control signal representative of the initiation of reading out the time series audio data to the compact disc driver 1. With the control signal, the compact disc driver 1 starts to read out the audio data codes/time codes D1/D2 from the compact disc CD. The audio data codes/time codes D1/D2 are supplied to the digital signal processor 3, and are 250 milliseconds delayed by the digital signal processor 3. The digital signal processor 3 sequentially supplies the audio data codes/time codes D1/D2 to the controller 4 together with the control signal representative of the sort of the data codes. When each of the time codes D2 arrives at the controller 4, the controller 4 transfers the time code D2 to the floppy disc driver 2. Using the time codes D2 and the delta time codes D4, the floppy disc driver 2 establishes the synchronization between the read-out of the event codes D3 and the read-out of the audio data codes D1.

The third major task is to produce an analog audio signal from a digital audio signal. The digital audio signal is supplied from the tone generator for ensembles 8. The analog audio signal is supplied from the controller 4 to the mixer 13.

The fourth major task relates to the second major task. The fourth major task is to selectively transfer the event codes D3 to the tone generator for ensembles 8 and the automatic playing controller 9. The user instructs the controller 4 as to which is the destination of the event codes D3 through the manipulating panel 5.

The fifth major task is to relay user's instruction to other system component such as the automatic playing controller 9.

The tone generator for ensembles 8 is connected to the controller 4, and produces the digital audio signal from the event codes D3. When the user specifies the tone generator for ensembles 8 as the destination, the event codes D3, which have been intermittently supplied from the floppy disc driver 2 to the controller 4, are supplied from the controller 4 to the tone generator for ensembles 8. The tone generator for ensembles 8 accesses wave memories with the addresses specified with the event codes D3, and produces the digital audio signal. The digital audio signal is supplied to the controller 4 or the mixer 13. The digital audio signal is converted to the analog audio signal by the controller 4 as described hereinbefore.

The mixer 13 has signal input ports connected to the digital signal processor 3, controller 4, tone generator for ensembles 8 and tone generator for piano tones 10. The digital signal processor 3 supplies the analog audio signal, which has been produced from the audio data codes D1, to the mixer, and the controller 4 or tone generator for piano tones 10 supplies the analog audio signal, which have been produced from the event codes D3, to the mixer. The tone generator for ensembles 8 supplies the digital audio signal to the mixer 13. The mixer 13 mixes those signals, and produces an analog audio signal. The mixer 13 supplies the analog audio signal to the amplifier 6. The analog audio signal is amplified, and is, thereafter, supplied to the speakers 7. The analog signal is converted to tones through the speakers 7.

The automatic playing controller 9 selectively achieves two major tasks depending upon the user's instruction. The user's instruction is replayed from the controller 4. The first major task is to transfer the event codes D3 to the tone generator for piano tones 10. The tone generator for piano tones 10 accesses a wave memory with the addresses specified with the event codes, and produces a digital tone signal. The digital tone signal is converted to the analog audio signal, and the analog audio signal is supplied from the tone generator for piano tones 10 to the mixer 13.

The second major task is to control the solenoid-operated key/pedal actuators 14*a* through the solenoid driver 11. The automatic playing controller 9 determines trajectories for the plungers of the solenoid-operated key/pedal actuators 14*a* associated with the keys/pedals to be moved on the basis of the event codes D3 representative of the note-on. The automatic playing controller 9 informs the solenoid driver 11 of the keys/pedals to be moved and the trajectories for the keys/pedals. The solenoid driver 11 adjusts driving voltage signals to potential levels appropriate for the trajectories, and supplies the driving potential levels to the solenoid-operated key/pedal actuators 14*a*. When the solenoid-operated key/pedal actuators 14*a* are energized with the driving signals, the plungers project, and push the associated keys and pedals. The keys and pedals are moved as if a human player depresses the keys and steps on the pedals. The depressed keys give rise to free rotation of the hammers, and the hammers strike the strings at the end of the free rotation. The strings vibrate, and generate acoustic piano tones.

When the event codes D3 representative of the note-off reaches the automatic playing controller 9, the automatic playing controller 9 instructs the solenoid driver 11 to remove the driving signal from the solenoid-operated key/pedal actuators 14*a*. The plungers are retracted, and the keys/pedals return to the respective rest positions.

There is a time lug between the transfer of an event data D3 through the controller 4 to the generation of the acoustic piano tone. The time lug is of the order of 500 milliseconds. When a user instructs the music player to reproduce the ensemble through the speakers 7 and the automatic player piano 15, the controller 4 instructs the floppy disc driver 2 to sequentially read out the event codes D3 and delta time codes D4 from the floppy disc FD. The event code D3*a* is read out from the floppy disc FD after 250 milliseconds from the initiation of reading out the MIDI codes, and the controller 4 instructs the compact disc driver 1 to start the read-out of the audio/time codes D1/D2 upon arrival of the event code D3*a*. Thus, the controller 3 introduces the delay of 250 milliseconds into the data read-out. As described hereinbefore, the digital signal processor 3 introduces the delay of 250 milliseconds into the signal propagation to the controller 4. Thus, each audio code D1 is 500 milliseconds delayed from the arrival of the event code D3. Even though the acoustic piano tone is 500 milliseconds delayed from the transfer of the event code D3 from the controller 4 to the automatic playing controller 9, the electric tone is radiated from the speakers 7 concurrently with the piano tone.

Figure 4:
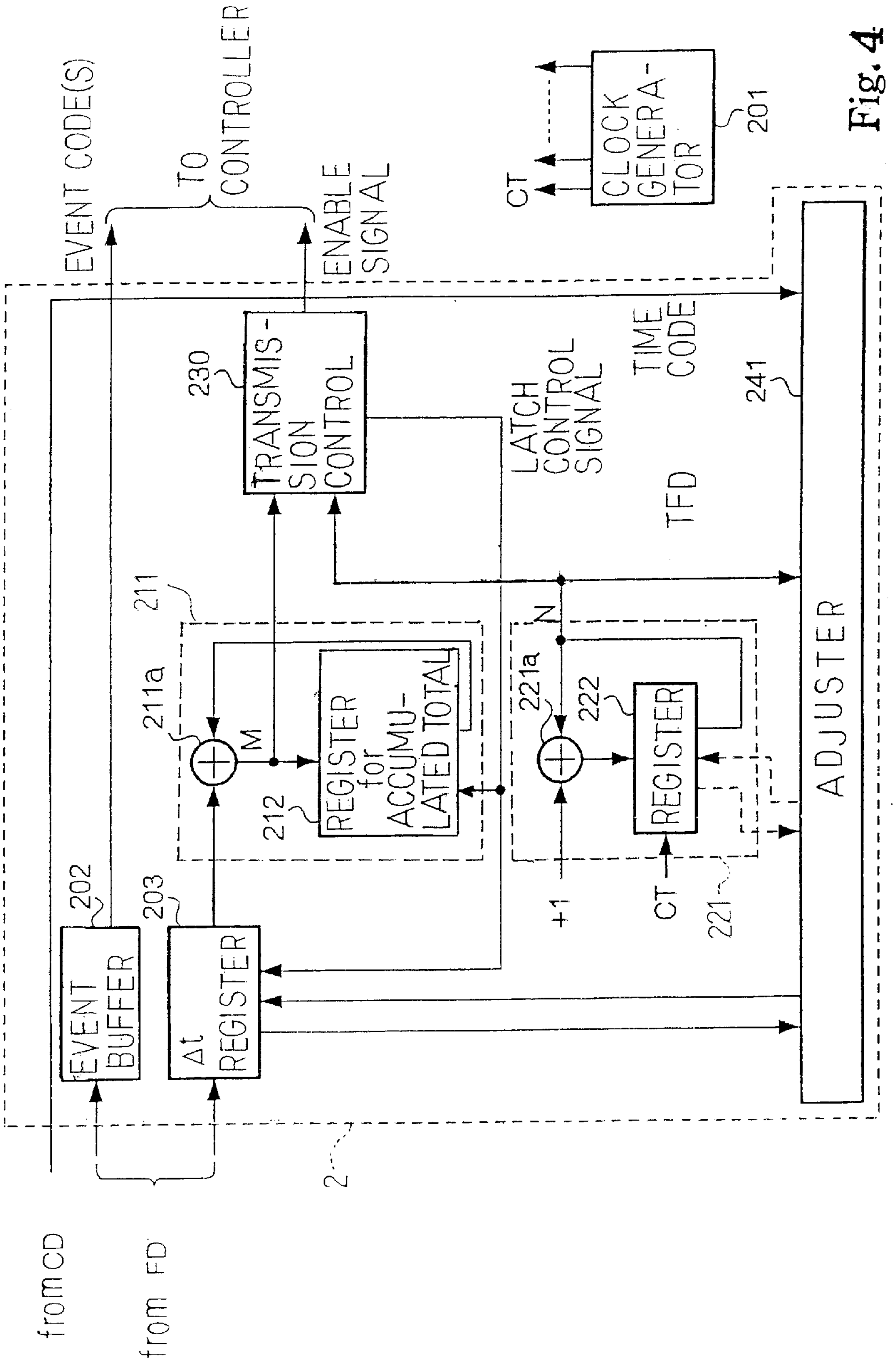
FIG. 4 is a block diagram showing the circuit configuration of a floppy disc driver incorporated in the music player.

Turning to FIG. 4 of the drawings, the floppy disc driver 2 includes an event buffer 202, a delta-time register 203, accumulators 211/221, a transmission control 230 and an adjuster 241 for the function as the timing regulator. The accumulator 211 is implemented by a combination of an adder 211*a* and a register 212, and an adder 221*a* and a register 222 constitute the other accumulator 221.

The event code or codes D3 and the delta-time code D4 are selectively supplied from the floppy disc FD to the event buffer 202 and delta-time register 203, and are stored in the event buffer 202 and the delta-time register 203, respectively. A delta-time code D4 may be followed by more than one event code. The event buffer 202 has a memory capacity much enough to store all the event codes. The value of the delta-time code D4 is equal to the number of tempo clocks CT to be counted between an event and the next event. The event buffer 202 is connected to the buffer 4*a* of the controller 4, and the delta-time register 203 is connected to the accumulator 211 and the adjuster 241.

The transmission control 230 has two input ports connected to the accumulator 211 and the adjuster 241, and compare the accumulated total M, which represents a target time to transfer the event code or codes D3, with a number N stored in the register 222 to see whether or not the event code or codes D3 are to be transferred to the controller 4. When the number N reaches the accumulated total M, the answer is given affirmative, and the transmission control 230 changes the enable signal and a latch control signal to an active level, and supplies the active enable/latch control signals to the controller 4 and the delta-time register/register for accumulated total 203/212. The transmission control 230 may supply the registers 203/212*a* write-in clock signal instead of the latch control signal.

The accumulator 211 accumulates the time intervals, i.e., the values of the delta-time codes D4, and supplies the accumulated total M to the transmission control 230. Each delta-time code D4 is representative of the number of tempo clocks CT to be counted between the event and the next event so that the accumulated total is also represented by the total number of tempo clocks counted from the initiation of reading out the MIDI codes. The adder 211*a* has to input ports respectively connected to the delta-time register 203 and the register for accumulated total 212, and the output port is connected to the register for accumulated total 212. Thus, the adder 211*a* and register 212 form an accumulating loop. When a user instructs the controller 4 to reproduce an ensemble, the register 212 is reset to zero. While the floppy disc driver 2 is sequentially reading out the MIDI codes, the floppy disc FD intermittently supplies the delta-time codes D4 to the delta-time register 203. When the number N reaches the accumulated total M, the transmission control 230 changes the latch control signal to the active level. With the active latch control signal, the next delta-time code D4 is stored in the delta-time register 203, and is immediately transferred to the adder 211*a* for accumulation. The adder 211*a* adds the delta time to the accumulated total M, and the new accumulated total M is stored in the register 212 in the presence of the latch control signal of the active level.

The other accumulator 221 counts the tempo clock CT. The adder 221*a* has two input ports respectively connected to a source of constant value "+1" and the register 222, and the output port of the adder 221*a* is connected to the register 222. The adder 221*a* and register 222 form an accumulating loop. The input port, at which the adder 221*a* is connected to the register 222, is further connected to the adjuster 241 and the transmission control 230, and the tempo clock CT is supplied to the register 222 as a latch control signal. When the user instructs the controller 4 to reproduce the ensemble, the register 222 is reset to zero. The adder 221*a* increments the number by one, and the total is stored in the register 222 in response to the tempo clock CT. Thus, the number N of the tempo clocks CT is stored in the register 222, and is supplied to the adjuster 241 and the transmission control 230.

The adjuster 241 is connected to the controller 4, accumulator 221 and delta-time register 203. The time codes D2 are transferred from the compact disc CD through the digital signal processor 3 and controller 4 to the adjuster 241, and the accumulator 221 supplies the number N of tempo clocks CT to the adjuster 241. The adjuster 203 achieves two major tasks as follows.

The adjuster 241 firstly calculates a lapse of time from the initiation of reading out the MIDI codes by multiplying the number N by the pulse period of the tempo clocks CT, i.e., $(N \times \tau)$. As described hereinbefore, the audio data/time codes D1/D2 are 500 milliseconds delayed from the corresponding MIDI codes. In order to equalize the dial plate of one clock to the dial plate of the other clock, the adjuster 241 subtracts 500 milliseconds from the lapse of time $(N \times \tau)$, and determines a lapse of time TFD from the arrival of the first audio code D1 at the controller 4, i.e., $\{(N \times \tau) - 500\}$.

The second task to be achieved by the adjuster 241 is to set the clock ahead or back. The lapse of time represented by the time code D2 is labeled with "TCD". First, the adjuster 241 checks the time code D2 to see whether or not the lapse of time TCD is greater than zero. While the answer is given negative, the adjuster 241 repeats it. When a time code D2 represents the lapse of time greater than zero, the answer is changed to affirmative. With the positive answer, the adjuster 241 compares the lapse of time TFD with the lapse of time TCD to see whether the lapse of time TCD is greater than, equal to or less than the lapse of time TFD. In case where the lapse of time TFD is different from the lapse of time TCD, the adjuster 241 further checks the lapses of time TFD/TCD to see whether or not the difference DF is fallen within a predetermined margin MG. The adjuster 241 proceeds to different steps depending upon the answers as follows.

Case 1: $TFD = TCD$ or $|DF| < MG$

The adjuster 241 sets the clock neither ahead nor back. The delta-time codes D4 are intermittently supplied from the floppy disc FD to the delta-time register 203, and are accumulated in the register 212. When the number N of the total tempo clocks CT reaches the accumulated total M, the transmission control 230 changes the enable signal and latch control signal to the active level. With the enable signal of the active level, the event code or codes D3 are latched in the buffer 4*a*, and the next delta-time code D3 is accumulated in the accumulator 211.

Case 2: $TFD > TCD$ and $|DF| > MG$

In this situation, the part reproduced through the automatic player piano 15 is advanced by the difference DF, i.e., TFD−TCD from the part reproduced through the speakers 7. The adjuster 241 firstly converts the time, i.e., difference DF to the number DN of tempo clocks CT by dividing the difference DF by the pulse period $\tau$. The product $(TFD-TCD)/\tau$ is equivalent to the time by which the part reproduced through the automatic player piano 15 is advanced. The adjuster 241 fetches the delta-time code D4 from the delta-time register 203, and adds the number DN to the value ND4 of the delta-time code D4. The adjuster 241 writes the difference $\{ND4+(TFD-TCD)/\tau\}$ in the delta-time register 203. Thus, the time interval represented by the delta-time code D3 is prolonged. The adjuster 241 supplies the delta-time code D4 to the register 203 so that the delta-time code D4 stored in the register 203 represents the number greater than the previous number. When the delta-time code D4 is accumulated in the register 212, the transmission control 230 retards the transmission of the event code or codes D3. This results in that both parts are synchronously reproduced through the automatic player piano 15 and speakers 7.

Case 3: TFD<TCD and |DF|>MG

The part reproduced through the automatic player piano 15 is delayed for the part produced through the speakers 7. The adjuster 241 converts the time lug, i.e., difference DF to the number DN of tempo clocks CT by dividing the difference DF by the pulse period τ. The product (TFD−TCD)/τ is equivalent to the time delay. The adjuster 241 fetches the delta-time code D4 from the delta-time register 203, and subtracts the number DN from the value ND4 of the delta-time code D4.

Subsequently, the adjuster 241 checks the calculation result to see whether or not the difference {ND4−(TFD−TCD)/τ} is a positive number. When the answer is given affirmative, the adjuster 241 writes the difference in the delta-time register 203. The time interval represented by the delta-time code D3 is shortened. The adjuster 241 supplies the delta-time code D4 to the register 203 so that the delta-time code D3 stored in the register 203 represents the number less than the previous number. When the delta-time code D4 is accumulated in the register 212, the transmission control 230 transmits the event code or codes D3 to the buffer 4*a* earlier than the previous schedule. This results in that the delay is canceled. Both parts are synchronously reproduced through the automatic player piano 15 and speakers 7.

On the other hand, if the difference is a negative number, the answer is given negative. In this situation, the adjuster 241 divides the product (TFD−TCD)/τ by a positive number a, and subtracts the products (TFD−TCD)/τα from the value ND4 of the delta-time code. If the positive number is 2, the difference is given as {ND4−(TFD−TCD)/2τ}. The adjuster 241 checks the calculation result to see whether or not the difference is a positive number. When the answer is given affirmative, the adjuster 241 writes the difference {ND4−(TFD−TCD)/2τ} in the delta-time register 203, and keeps the other half, i.e., (TFD−TCD)/2τ in an internal register (not shown). The adjuster 241 will subtract the other half from the value of the next delta time. Thus, the adjuster 241 stepwise takes up the time lug in order to make the two parts synchronous with one another. If the difference {ND4−(TFD−TCD)/2τ} is still given negative, the adjuster 241 increases the divisor, and repeats the above-described sequence.

Figure 5:
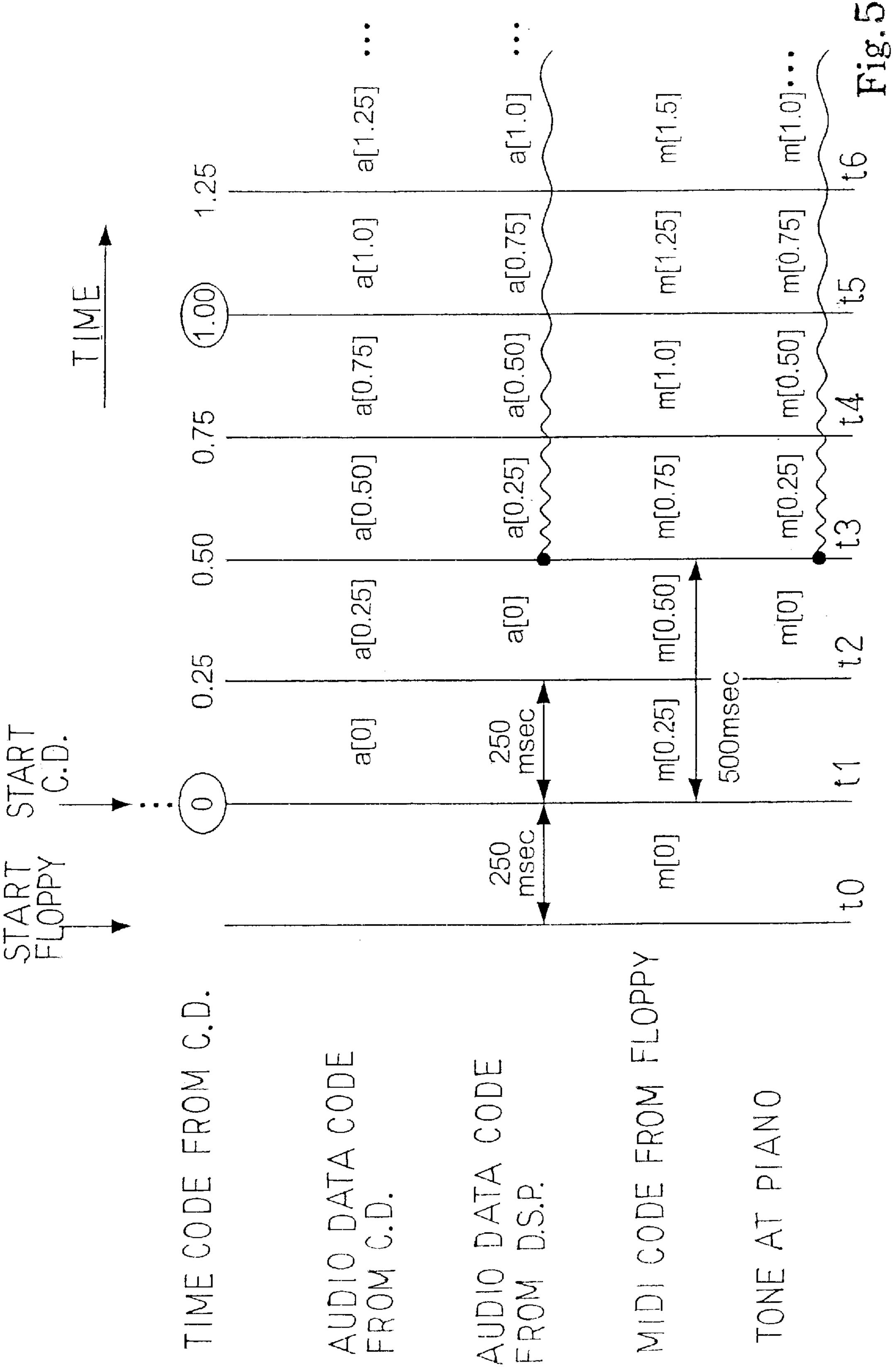
FIG. 5 is a timing chart showing reproduction of an ensemble through the music player.

FIG. 5 shows reproduction of an ensemble on the assumption that a user instructs the controller 4 to start the reproduction at the head. The time codes D2 are inserted at intervals of 0.25 second (see "TIME CODE FROM C.D."), and the audio data codes a[k] (k=0, 0.25, 0.5, 0.75, . . . ) are read out from between k second and k+1 second (see "AUDIO DATA CODE FROM C.D."). The digital signal processor 3 introduces the time delay of 250 millisecond into the propagation of the audio data code a[k] so that the audio data codes a[k] is delayed between the second row and the third row. On the other hand, the MIDI codes m[k] (k=0, 0.25, 0.5, 0.75, . . . ) are read out from the floppy disc (see "MIDI CODE FROM FLOPPY"), and the acoustic piano 12 produces the piano tones m[k] (k=0, 0.25, 0.5, 0.75, . . . ). The piano tones are 500 milliseconds delayed from the read out of the MIDI codes (compare the fourth row with the fifth row).

Assuming now that a user instructs the controller 4 to reproduce the ensemble at time t0, the controller 4 immediately instructs the floppy disc driver 2 to read out the MIDI codes D3 from the floppy disc FD, and the MIDI codes are sequentially supplied from the floppy disc FD through the floppy disc driver 2 to the controller 4. The MIDI codes m[0] are read out between time t0 and time t1, and the MIDI codes m[0.25] are read out between time t1 and time t2. The MIDI codes m[1.25] are read out from the floppy disc FD between time t5 and time t6, and the MIDI codes m[1.5] are read out from the floppy disc FD after time t6. The floppy disc driver 2 controls the timing at which the event code or codes D3 are transferred to the controller 4. However, while the controller 4 is waiting for the event code D3*a*, any time code D2 does not reach the floppy disc driver 2, and, accordingly, the floppy disc driver 2 transfers the event code or codes D3 to the buffer 4*a* at the timing defined by the delta-time code D4.

The event code D3*a* is supplied from the floppy disc FD to the controller 4 250 millisecond after the initiation of reading out the MIDI codes. The controller 4 immediately instructs the compact disc driver 1 to read out the audio data codes D1 and time codes D2 from the compact disc CD. The audio data codes a[0] is read out from the compact disc CD between time t1 and time t2, and the audio data codes a[0.25] are read out from the compact disc CD between time t2 and time t3.

The event codes m[0] are transferred through the automatic playing controller 9 to the solenoid driver 11, and the solenoid driver 11 energizes the solenoid-operated key actuators 14*a* associated with the keys to be moved. The keys give rise to rotation of the hammers, and produces the tones m[0] between time t2 and time t3. The tones m[0] are 500 milliseconds delayed from the read-out of the MIDI codes m[0].

On the other hand, the audio data codes a[0] are transferred from the compact disc driver 1 to the digital signal processor 3, and are supplied to the controller 4 250 milliseconds after the reception. While the digital signal processor 3 is waiting for the expiry of the time period, the digital signal processor 3 analyzes the data codes, and determines the sort of data codes. When the digital signal processor 3 determines the sort of data codes, the digital signal processor 3 informs the controller 4 of the sort of data codes. In this instance, the digital signal processor 3 informs the controller 4 that the data codes are audio data codes D1 without any MIDI code. Upon expiry of 250 milliseconds, the digital signal processor 3 supplies the audio data codes a[0], a[0.25], . . . to the controller 4, and the audio data codes a[0], a[0.25], . . . are converted through the digital audio signal to the analog audio signal. Finally, the speakers 7 produce the electric tones from the analog audio signal.

The time codes [0], [0.25], [0.5], . . . are transferred from the controller 4 to the adjuster 241 of the floppy disc driver 2. Although the adjuster 241 does not carry out the timing regulation on the basis of the first time code [0]. However, when the next time code [0.25] reaches the adjuster 241, the adjuster 241 starts the timing regulation as described hereinbefore.

The ensemble starts at 250 milliseconds after the initiation of reading out the audio data codes (see a[0] and m[0] at time t2). However, the music player synchronously reproduces the two parts through the automatic player piano 15 and the speakers 7 at 500 milliseconds after the initiation of reading out the audio data codes D3 as indicated by waves. In other words, the tones m[0.25] are reproduced through the automatic player piano 15 synchronously with the tones a[0.25].

Figure 6:
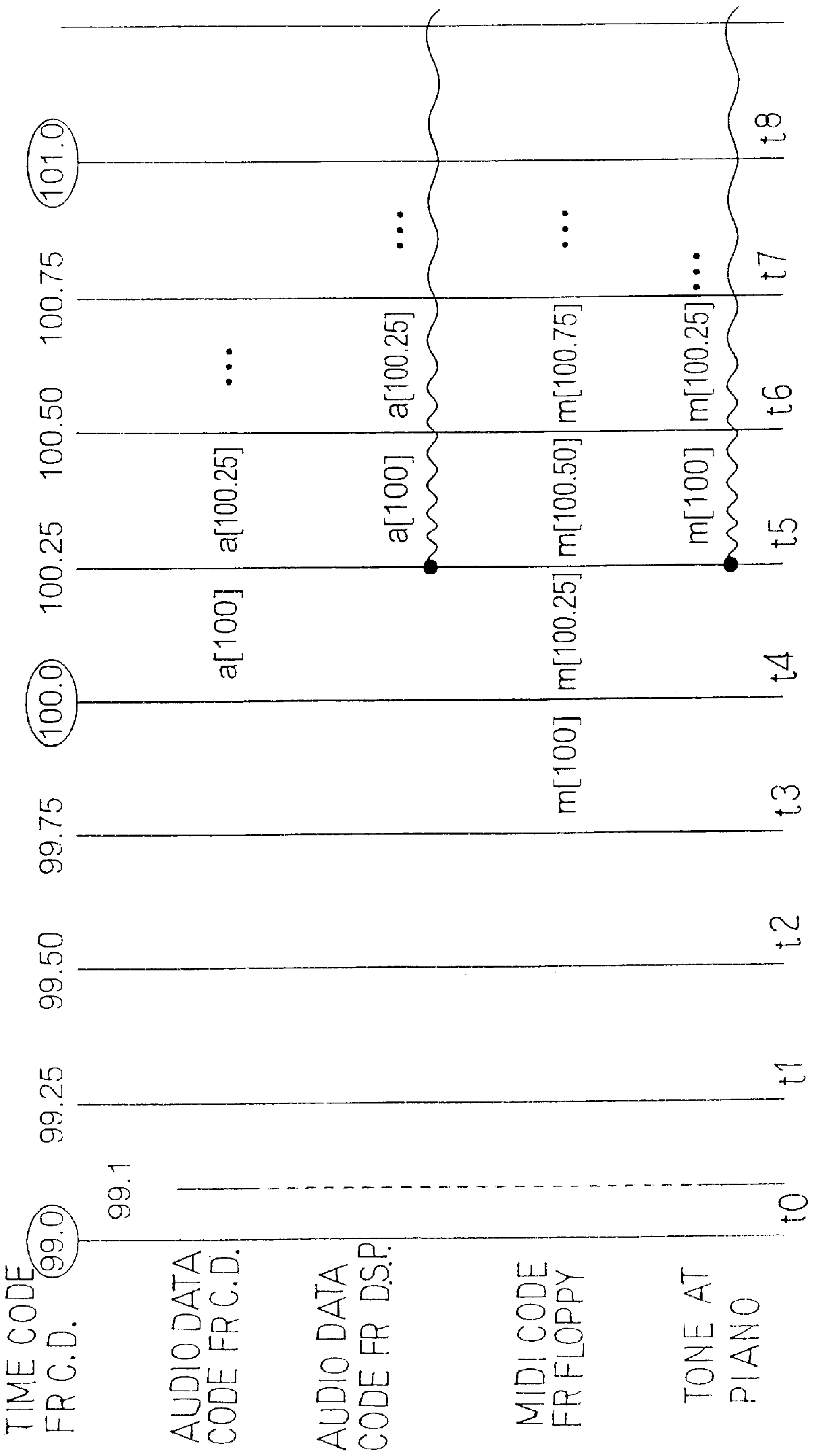
FIG. 6 is a timing chart showing reproduction of another ensemble through the music player.

A user is assumed to instruct the music player to reproduce an ensemble on the way to the end of a piece of music. FIG. 6 shows the reproduction of the ensemble. The music player has reproduced the piece of music. When the user instructs the controller 4 to stop the playback, the controller 4 responds to the instruction, and temporarily stores the time code D2 presently valid in the internal register. In this instance, the user instructs the controller 4 to stop the playback at time [99.1]. The time code [99.25] has not reached the controller 4, yet, and the valid time code is [99.0]. The controller 4 temporarily stores the time code [99.0] in the internal register.

When the user instructs the controller 4 to restart the playback in ensemble, the controller 4 adds a predetermined time period to the value of the time code [99.0] so as to specify the restarting point PREP. In this instance, the predetermined time period is a second so that the music player will restart the playback in ensemble at [100.0]. The controller 4 supplies the restarting point PREP to the floppy disc driver 2 together with the instruction to read out the MIDI codes synchronously with the audio data codes D1.

The floppy disc driver 2 responds to the instruction so that the floppy disc driver 2 sequentially reads out the event code or codes D3 and delta-time codes D4 from the floppy disc FD, and accumulates the values of the read-out delta-time codes D2. The event code or codes D3 are stored in the event buffer 202, and are rewritten together with the delta-time code D4. While the values of the delta-time codes D4 are being accumulated in the accumulator 211, the adjuster 241 checks the accumulated total to see whether or not the time period equivalent to the accumulated total slightly exceeds the restarting point PREP. The adjuster 241 determines the difference between the time equivalent to the accumulated total and the restarting point PREP, and converts the difference to a number of tempo clocks. The adjuster 241 writes the number of tempo clocks into the register 222.

When the accumulated total M reaches the time 250 milliseconds earlier than the restarting point PREP, the transmission control 230 supplies the event code or codes D3 to the buffer 4*a*, and the controller 4 transfers the event code or codes D3 to the automatic playing controller 9. The tone m[100] is produced at time [100.25]. On the other hand, the controller 4 instructs the compact disc driver 1 to restart the read-out of the audio data codes D1 after the instruction to the floppy disc driver 2, and gives the restarting point [100] to the compact disc driver 1. The compact disc driver 1 does not transfer the audio data codes D1 to the digital signal processor 3 until the restarting point PREP. The compact disc driver 1 restarts the code transmission to the digital signal processor 3 at time PREP, and the audio data codes a[100] is supplied to the digital signal processor 3. The audio data codes a[100] is transferred to the controller 4 250 milliseconds after the reception, and the electronic tone a[100] is radiated from the speakers 7 at time [100.25]. Thus, the music player synchronously reproduces the two parts through the automatic player piano 15 and speakers 7.

The controller 4 transfers the time code [100] to the adjuster 241 of the floppy disc driver 2, and the adjuster 241 starts the timing regulation. The adjuster 241 behaves as similar to that in the reproduction at the head of the piece of music, and the electronic tones and acoustic tones are synchronously reproduced through the automatic player piano 15 and the speakers 7.

As will be understood from the foregoing description, the music player according to the present invention is equipped with the timing regulator, and the timing regulator varies the time interval between the event codes D3 in accordance with the lapse of time from the initiation of reading out the audio data/time codes D1/D2. As a result, the plural sorts of music data concurrently reach plural sound generators 6/7/8/10/13 and 15, and the plural sound generators 6/7/8/10/13 and 15 synchronously produce plural parts of a piece of music. Thus, the timing regulator makes the plural parts synchronously reproduced through the plural sound generators.

In the first embodiment, the event buffer 202, delta-time register 203 and transmission control 230 as a whole constitute the sequencer, and the accumulator 211 serves as the data converter. The accumulator 221 and adjuster 241 form in combination the timing regulator.

In the first embodiment, the read-out head, event buffer 202 and transmission control 230 of the floppy disc driver 2 and compact disc driver 1 serve as the first data source and second data source, respectively, and the MIDI codes and audio data/time codes are corresponding to the first sort of music data and second sort of music data, respectively. The automatic player piano 15 serves as the first sound source, and the digital signal processor 3, mixer 13, amplifier 6 and speakers 7 as a whole constitute the second sound source. The delta-time register 203, accumulators 211/221, adjuster 614 and controller 4 as a whole constitute the controlling system.

Second Embodiment

Figure 7:
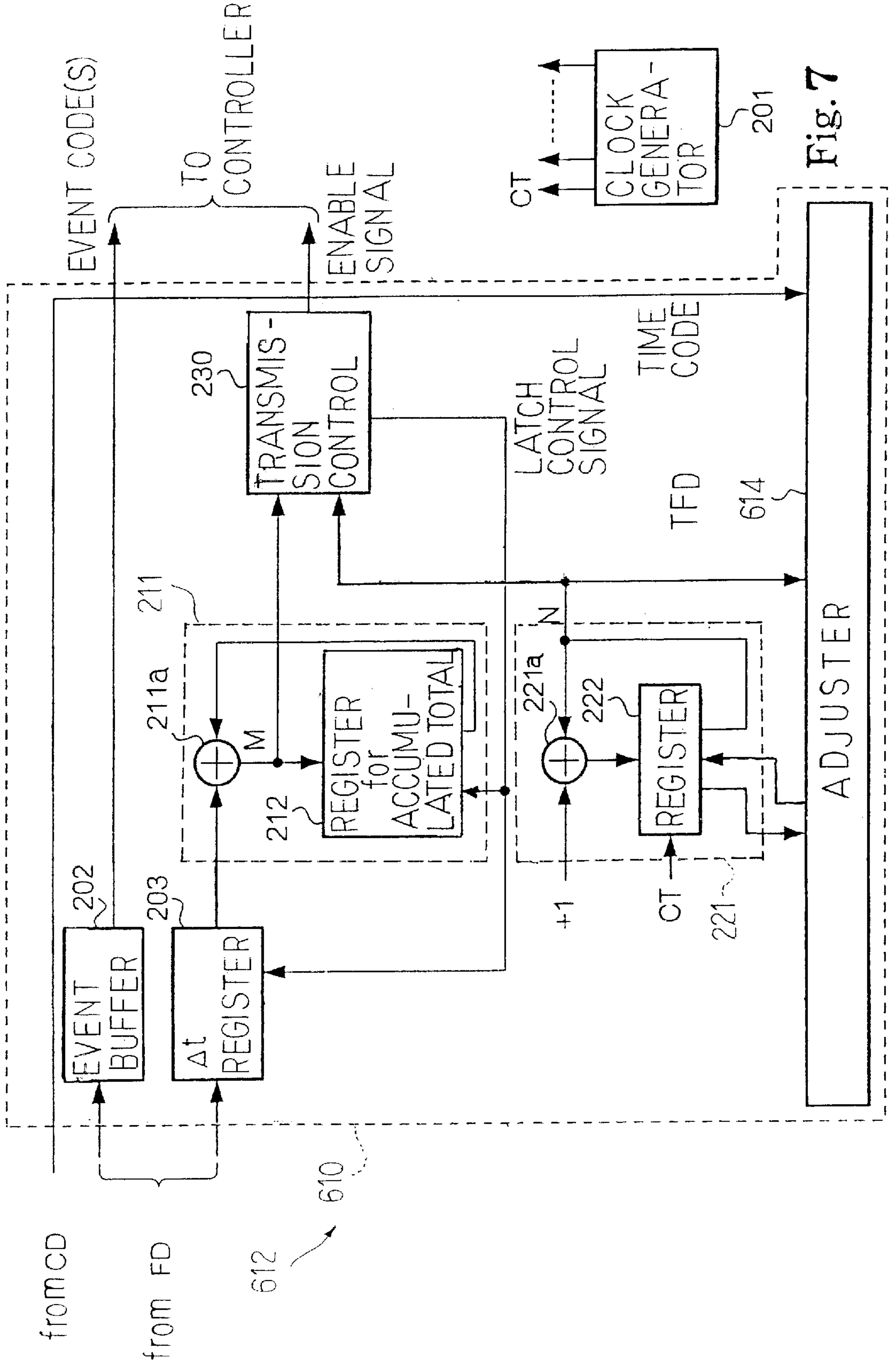
FIG. 7 is a block diagram showing the system configuration of another music player according to the present invention.

Turning to FIG. 7 of the drawings, a floppy disc driver 610 is incorporated in another music player embodying the present invention. The floppy disc driver 610 also has an information processing capability. The music player implementing the second embodiment also comprises a controlling system 612 and a sound source, and the sound source has plural sound generators as similar to the first embodiment. The controlling system 612 is similar to the controlling system 600 except an adjuster 614. For this reason, the other components are labeled with same references designating corresponding component of the controlling system 600 without detailed description.

The adjuster 614 is connected to the register 222, but is not connected to the delta-time register 203. This means that the adjuster 614 varies the number of tempo clocks CT in accordance with the lapse of time stored in the time code D2. The time codes D2 are sequentially supplied from the controller 4 to the adjuster 614.

When the time code D2 reaches the adjuster 614, the adjuster 614 checks the time code D2 to see whether or not the lapse of time from reading out the audio data codes D1 is equal to zero. The first time code D2 is indicative of zero. The answer is given affirmative, and the adjuster 614 ignores the first time code D1. The time codes D2 after the first time code are indicative of finite values of the lapse of time, and the answer is changed to the negative answer. TCD is representative of the lapse of time from the initiation of reading out the audio data codes.

With the negative answer, the adjuster 614 accesses the register 222, and fetches the number N of tempo clocks CT stored in the register 222. The adjuster 614 calculates the lapse of time TFD on the basis of the number N of tempo clocks CT as $TFD=N\times\tau-500$, and compares the lapse of time TFD with the lapse of time TCD. The adjuster 614 calculates the difference DF between TFD and TCD. The adjuster 614 proceeds to a step depending upon the result of comparison and the difference DF.

Case 1: $TFD=TCD$ or $|DF|<MG$

The adjuster 614 sets the clock neither ahead nor back. The delta-time codes D4 are intermittently supplied from the floppy disc FD to the delta-time register 203, and are accumulated in the register 212. When the number N of the total tempo clocks CT reaches the accumulated total M, the transmission control 230 changes the enable signal and latch control signal to the active level. With the enable signal of the active level, the event code or codes D3 are latched in the buffer 4*a*, and the next delta-time code D3 is accumulated in the accumulator 211.

Case 2: TFD>TCD and |DF|>MG

In this situation, the part reproduced through the automatic player piano 15 is advanced by the difference DF, i.e., TFD−TCD rather than the part reproduced through the speakers 7. The adjuster 614 firstly converts the time difference DF to the number DN of tempo clocks CT by dividing the difference DF by the pulse period $\tau$. The product (TFD−TCD)/$\tau$ is equivalent to the time by which the part reproduced through the automatic player piano 15 is advanced. The adjuster 614 fetches the number N of total tempo clocks CT from the register 222, and subtracts the number DN from the number N of the total tempo clocks CT. The adjuster 614 writes the difference $\{N-(TFD-TCD)/\tau\}$ in the register 222. Thus, the current time is set back, and the transmission control 230 retards the transmission of the event code or codes D3. This results in that both parts are synchronously reproduced through the automatic player piano 15 and speakers 7.

Case 3: TFD<TCD and |DF|>MG

The part reproduced through the automatic player piano 15 is delayed from the part produced through the speakers 7. The adjuster 614 also converts the time difference DF to the number DN of tempo clocks CT by dividing the difference DF by the pulse period $\tau$. The product (TFD−TCD)/$\tau$ is equivalent to the time delay. The adjuster 614 fetches the number N of total tempo clocks CT from the register 222, and adds the number DN to the number N of the total tempo clocks CT. The adjuster 614 writes the sum into the register 222. Thus, the current time is set ahead, and the transmission of the event code or codes D3 is accelerated. This results in that the two parts are synchronously reproduced through the automatic player piano 15 and speakers 7.

As will be understood from the foregoing description, the timing regulator monitors the time codes D2 to see whether or not the transmission of event codes D3 is synchronized with the transmission of audio data codes D1. If the transmission of event codes D3 is advanced from or delayed for the transmission of audio data codes D1, the timing regulator sets the clock, i.e., N back or ahead so as to establish the synchronization between the plural parts of the piece of music.

Third Embodiment

Figure 8:
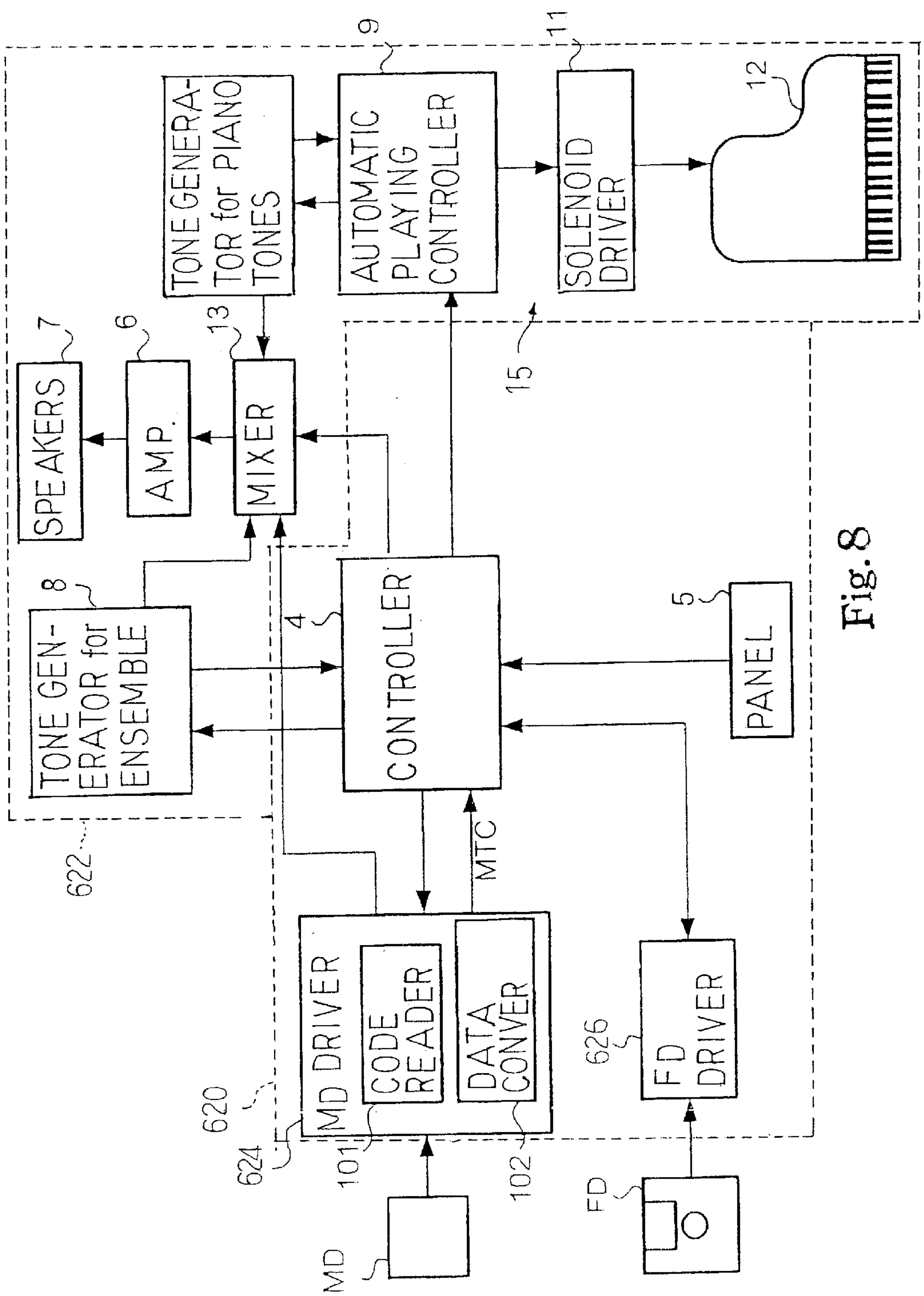
FIG. 8 is a block diagram showing the system configuration of yet another music player according to the present invention.
Figure 9:
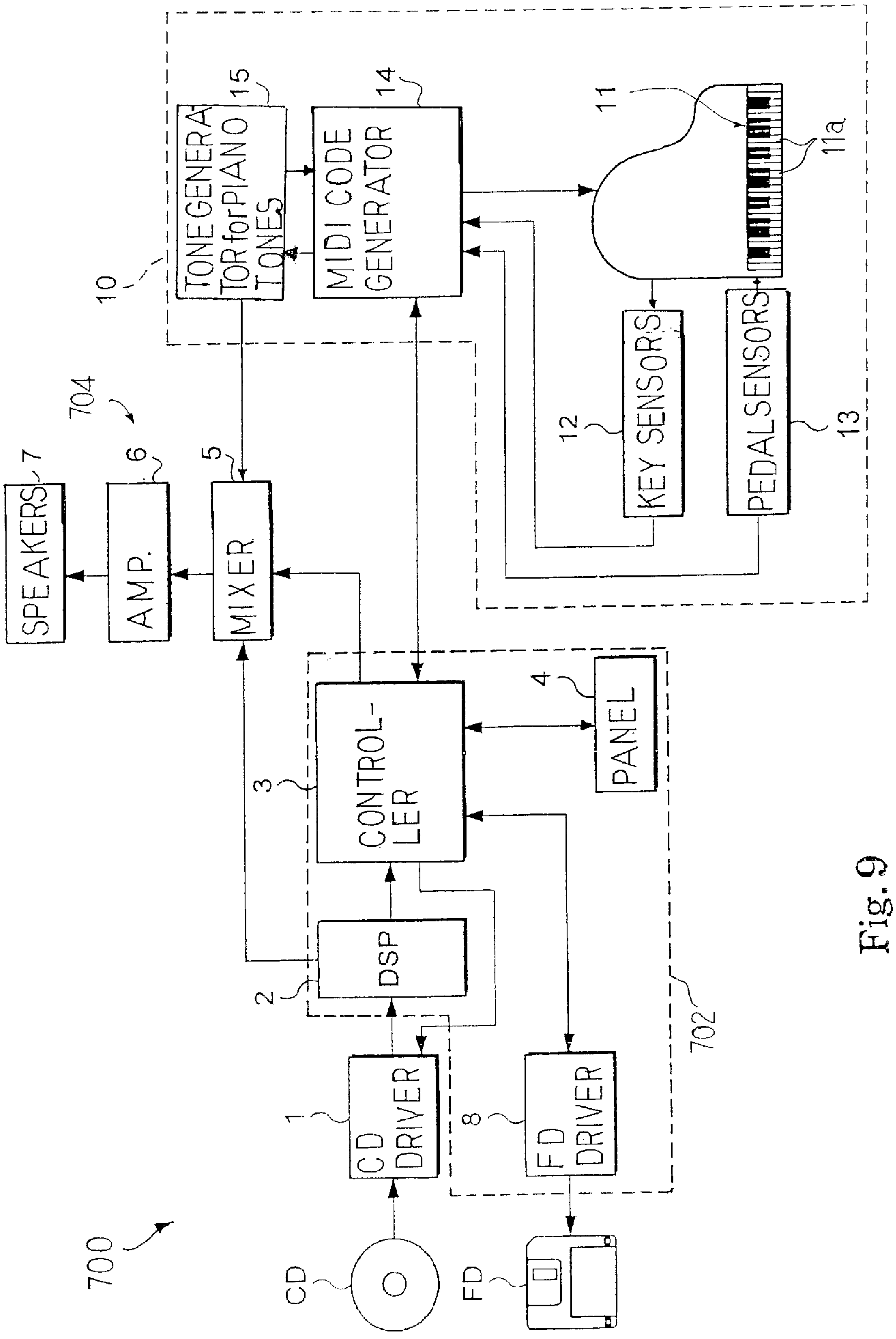
FIG. 9 is a block diagram showing the system configuration of a music recorder/player according to the present invention.

FIG. 8 shows yet another music player embodying the present invention. The music player implementing the third embodiment also comprises a controlling system 620 and a sound source 622. The sound source 622 is similar to the sound source 602. However, the controlling system 624 is different from the controlling system 600 in that the compact disc driver/digital signal processor 1/3 and floppy disc driver 2 are respectively replaced with a mini disc driver 624 and a floppy disc driver 626. The mini disc driver 624 and floppy disc driver 626 have information processing capabilities, respectively. The other components are labeled with the references designating corresponding components of the first embodiment without detailed description for the sake of simplicity.

Audio data codes and time codes are stored in the mini disc MD, and MIDI codes are stored in a floppy disc FD. The MD driver 624 has a code reader 101 and a data converter 102, and the floppy disc driver 626 serves as both of the sequencer and a part of the timing regulator.

The code reader 101 reads out the audio data codes and time codes from the mini disc MD. The code reader 101 checks the read-out code to see whether it is an audio data code or a time code for the mini disc. The code reader 101 introduces a delay of 250 milliseconds into the propagation of audio data codes to the controller 4. Otherwise, the code reader 101 produces an analog audio signal from the audio data codes D1. The delayed audio data codes are supplied to the controller 4, and the analog audio signal is supplied to the mixer 13.

The time codes for mini discs are transferred from the code reader 101 to the data converter 102. The data converter 102 converts the time codes to the delta-time codes MTC representative of a time interval between the tones to be synchronized with the tones reproduced through the automatic player piano, and introduces the time delay of 250 milliseconds into the propagation of the delta-time codes D3 to the controller 4.

The floppy disc driver 626 intermittently receives the delta-time codes D3, and compares certain delta-time codes D3 with corresponding delta-time codes MTC to see whether or not the time interval between the certain delta-time codes D3 is equal to the time interval between the corresponding delta-time codes MTC. If the answer is given negative, the floppy disc driver 626 supplies a status signal representative of the advance or delay to the controller 4. The controller 4 is responsive to the status signal so that the controller 4 instructs the MD driver 624 to vary the read-out speed or the delay of 250 milliseconds. Thus, the two parts are synchronized with each other.

The floppy disc driver 626 may vary the delta time or the number of accumulated tempo clocks CT instead of the supply of the status signal to the controller 4.

As will be appreciated from the foregoing description, the floppy disc driver 626 compares the value of the delta-time codes D3 with the number of accumulated tempo clocks CT to see whether or not the audio data codes are advanced from or delayed for the corresponding MIDI codes, and the code reader 101 varies the timing at which the audio data codes are converted to the analog audio signal. As a result, the part produced through the automatic player piano 15 is reproduced synchronously with the part produced through the speakers 7.

In the third embodiment, the floppy disc driver 626 serves as the sequencer, and adjuster 241 and code reader 101 form in combination the timing regulator.

Music Recorder

A music recorder according to the present invention comprises a first data source, a second data source, a recording system and a controlling system. The first data source and second data source are connected to the controlling system. The first data source sequentially produces a first sort of music data, which contains pieces of first music data information representative of first tones. The time intervals between the pieces of first music data information are to be defined by pieces of first time data information. The second data source sequentially produces a second sort of music data, and the second sort of music data contains pieces of second music data information representative of second tones and pieces of second time data information representative of a lapse of time. The second tones are to be produced along the lapse of time. The controlling system produces the pieces of first time data information, and supplies the pieces of first music data information and pieces of first time data information to the recording system for storing them in an information storage medium as follows.

When the music recorder instructs the second data source to supply the second sort of music data, the second data source supplies the pieces of second time data information to the controlling system. The pieces of second music data information may be supplied to a sound source for generating the second tones.

The controlling system measures a reference lapse of time on which the time intervals are to be defined. The controlling system compares the lapse of time with the reference lapse of time to see whether or not the difference therebetween is ignoreable. If the answer is given negative, the controlling system continues to measure the reference lapse of time. On the other hand, if the answer is given negative, the controlling system increases or decreases the reference lapse of time so as to minimize the difference. When each piece of first music data information reaches the controlling system, the controlling system calculates the time interval between the arrival of the previous piece of first music data information and the piece of first music data information, and produces a corresponding piece of first time data information. The piece of first music data information and corresponding piece of time data information are supplied from the controlling system to the recording system. The recording system writes the piece of first music data information and piece of first time data information in an information storage medium.

Thus, the first sort of music data is recorded in the information storage medium synchronously with the second sort of music data.

First Embodiment

Referring to FIG. 8 of the drawings, a music recorder/player embodying the present invention is shown and generally indicated at 700. The music recorder/player 700 largely comprises two music data sources 1/10, a synchronous music recorder 702 and a music player 704. In this instance, one of the two music data sources is a compact disc driver 1, and the other music data source is an electronic piano 10. The composite keyboard musical instrument may be replaced with an automatic player piano with sensors. The two music data sources 1/10 supplies two sorts of music data codes to the synchronous music recorder 702 and the music player 704, which are coded on the basis of different standards. Especially, the two sorts of music data codes contain time codes, which are different in meaning. The music data codes supplied from the music data source 1 and the music data codes supplied form the other music data source 10 may be representative of one part of a piece of music and another part of the piece of music.

When a user instructs the synchronous music recorder 702 to record an ensemble, the synchronous music recorder 702 requests the music data sources 1/10 to send the two sorts of music data codes thereto. The music data sources 1/10 sequentially supply the two sorts of music data codes containing the time codes to the synchronous music recorder 702. The synchronous music recorder 702 converts the time codes forming parts of one sort of music data codes to time codes identical in meaning with the time codes forming parts of the other sort of music data codes, and compares the converted time codes with the time codes forming the corresponding parts of the other sort of music data codes to see whether or not the two parts are synchronous with one another. The synchronous music recorder 702 sequentially writes the music data codes in a floppy disc FD. When the answer is given positive, the synchronous music recorder 702 stores the music data codes in the floppy disc FD. However, if the answer is given negative, the synchronous music recorder 702 modifies the time code, and writes the modified time code into the floppy disc FD.

The synchronous music recorder 702 includes a digital signal processor 2, a controller 3, a manipulating panel 4 and a floppy disc driver 8. The controller 3 has an information processing capability. The floppy disc driver 8 also has an information processing capability. The electronic piano 10 includes a keyboard 11, key sensors 12 for black/white keys 11*a*, pedal sensors 13 for plural pedals, a MIDI code generator 14 and a tone generator for piano tones 15. The music player 704 includes the digital signal processor 2, the controller 3, a mixer 5, an amplifier 6, speakers 7 and the tone generator for piano tones 15. In case where an automatic player piano is used as the data source 10, the automatic player piano forms a part of the music player 704.

In this instance, the one sort of music data codes, which are stored in a compact disc CD, represents a time series audio data, and bibliographical data are further stored in the compact disc CD. The time series audio data are expressed by audio data codes D1 and time codes D2 (see FIG. 2A). The other sort of music data codes, which are supplied from the electronic piano 10, represents MIDI data. The MIDI data are expressed by event codes D3 and delta-time codes D4 (see FIG. 2B). Those components and the compact disc driver 1 are hereinafter described in more detail.

The compact disc driver 1 has a signal input port and a signal output port. Plural compact discs CD are loaded in the compact disc driver 1, and a user selects one of the plural compact discs CD for playback and recording. The compact disc driver 1 is connected through the signal output port to the digital signal processor 3, and receives a control signal from the controller 3 at the signal input port. The control signal is representative of the initiation of reading out the bibliographical data and time series audio data. The compact disc driver 1 is connected through the signal output port to the digital signal processor 3, and supplies the audio data codes D1 and time codes D2 to the digital signal processor 3. A compact disc to be loaded in the compact disc driver 1 may store another sort of music data. For example, a compact disc stores time series audio data for the left channel and MIDI data for the right channel or vice versa.

The digital signal processor 2 has a signal input port and signal output ports. The signal input port is connected to the signal output port of the compact disc driver 1, and the signal output ports are connected to the controller 3 and the mixer 5, respectively. The digital signal processor 2 achieves several major tasks.

First, the digital signal processor 2 introduces a delay of 250 milliseconds into the propagation of the time codes D2 from the compact disc driver 1 to the controller 3. Another major task is to produce an analog audio signal from the audio data codes D1, and supplies the analog audio signal to the mixer 5. The digital signal processor 2 introduces the delay of 250 milliseconds between the reception of the audio data codes D1 and the transmission of the corresponding parts of the analog audio signal for an ensemble.

Yet another major task is to determine the sort of data codes supplied from the compact disc driver 1, and is carried out within the delay of 250 milliseconds. When a data code arrives at the digital signal processor 2, the digital signal processor 2 analyzes the data codes, and determines the sort of data codes. When the digital signal processor 2 makes a decision that the data code is available for reproduction of a piece of music or the like, the digital signal processor 2 supplies the analog audio signal to the mixer 5. However, if the digital signal processor 2 makes another decision that the data code is only an origin of noise, the digital signal processor 2 does not supply the analog audio signal to the mixer 5. The digital signal processor 2 supplies a control signal representative of the inadequacy to the controller 3.

Still another major task is to supply identification codes ID representative of the bibliographical data to the controller 3. Each of the compact discs CD for music stores a disc identification code C-ID used for discriminating itself from other individual compact discs CD and music identification codes M-ID representative of the pieces of music stored therein.

The manipulating panel 4 is connected to the controller 3, and has plural switches, indicators and a display window. One of the switches is a power switch. When the power switch is manipulated, the music recorder/music player 700 is energized, or the electric power is removed therefrom. Another switch is used for specifying the modes of operation, i.e., an ensemble mode or a solo mode. Users selectively manipulate the switches for giving their instructions to the music recorder/music player 700. The music recorder/music player 700 notifies users of the current state, mode and pieces of information such as the title of a musical composition to be reproduced or recorded through the indicators and display window. When a user instructs the music recorder/music player 700 a playback, the controller 3 supplies an image carrying signal to the panel for producing the images of the compact discs CD on the basis of the disc identification codes C-ID. The user is assumed to select one of the compact discs CD, the controller 3 supplies the control signal requesting the compact disc driver 1 to transfer the music identification codes. The digital signal processor 2 reads out the music identification codes M-ID from the selected compact disc CD, and the digital signal processor 2 transfers them to the controller 3. The controller 3 supplies the image-carrying signal to the manipulating panel 4, and makes the manipulating panel 4 produce images of the titles of musical compositions on the display window.

The controller 3 has signal input ports, which are connected to the digital signal processor 2, floppy disc driver 8, manipulating panel 5 and the MIDI code generator 14. The controller 3 further has signal output ports, which are connected to the compact disc driver 1, manipulating panel 4, floppy disc driver 8, mixer 5 and a MIDI code generator 14. The controller 4 communicates with these system components 1, 2, 4, 5, 8 and 14, and accomplishes the following major tasks.

The first major task is to interpret user's instructions. Users give instructions to the manipulating panel 4, and instruction signals are supplied from the manipulating panel 4 to the controller 3. The controller 3 analyzes the instruction signal, and determines the major task to be achieved. The instruction which deeply concerns the present invention is to request the controller 3 to record a performance on the keyboard 11 synchronously with the playback of a piece of music from a compact disc. When a user instructs the controller 3 to record the performance synchronously with the playback, the controller 3 supplies a control signal representative of the synchronous recording to the compact disc driver 1 and floppy disc driver 8. Only the MIDI codes are stored in a floppy disc FD through the synchronous recording. This means that the audio data codes and time codes DI/D2 are not recorded in the floppy disc FD.

The second major task is to transfer the event codes D3 from the MIDI code generator 14 to the floppy disc driver 8 and the time codes D2 from the digital signal processor 2 to the floppy disc driver 8. As described hereinbefore, the reception of each time code D2 is 250 milliseconds delayed for the read-out of the time code D2. However, the even codes D3 reach the floppy disc driver 8 250 milliseconds delayed for generation of the corresponding piano tones. Thus, the event codes D3 reach the floppy disc driver 8 concurrently with the corresponding time codes D2.

The keyboard 11 has black/white keys 11*a*, and the key sensors 12 are provided beneath the black/white keys 11*a*. The key sensors 12 monitor the associated black/white keys 11*a*, respectively. The key sensors 12 produce key position signals representative of current positions of the associated black/white keys 11*a*. The key position signals are supplied from the key sensors 12 to the MIDI code generator 14. The pedals (not shown) are respectively associated with the pedal sensors 13, and produce pedal position signals representative of current pedal positions. When a user selectively steps on the pedals, the pedal sensors 13 supply the pedal position signals to the MIDI code generator 14.

The MIDI code generator 14 is connected at signal ports to the key sensors 12 and pedal sensors 13, and periodically fetches the key position signals and pedal position signals. The MIDI code generator 14 stores a series of current key positions of each black/white key 11*a* and a series of current pedal positions of each pedal in an internal working memory, and analyzes the data stored in the working memory to see whether or not the user moves any one of the black/white keys 11*a* or any one of the pedals and how the user moves the black/white key 11*a* or pedal. While the user neither depresses nor releases any key/pedal, the answer is given negative, and the MIDI code generator 14 continues to periodically fetch the key position signal and pedal position signal for the analysis. When the MIDI code generator 14 finds the user to move a black/white key 11*a*, the MIDI code generator 14 determines the note number assigned to the moved black/white key 11*a*, and calculates the velocity of the moved black/white key 11*a*. The note number is corresponding to the pitch of the tone to be produced, and the key velocity is equivalent to the loudness of the tone. The MIDI generator 14 generates MIDI codes for the moved key/pedal. The event, i.e., note-on event or note-off event, key number and key velocity are stored in the set of MIDI codes for the moved key 11*a*. The MIDI code generator 14 determines the lapse of time from the previous event, and adds the delta-time code representative of the time interval between the events. On the other hand, when the MIDI code generator 14 finds the user to step on one of the pedals, the MIDI code generator 14 identifies the moved pedal with a pedal number, and determines the stroke of the moved pedal. The MIDI code generator 14 generates a set of MIDI codes representative of the effect to be imparted to the tone or tones and the time interval from the previous event, if necessary.

The MIDI code generator 14 supplies the MIDI codes to the tone generator for piano tones 15 and/or the controller 3. In case where the MIDI codes, i.e., the event codes D3 and delta-time codes D4 are supplied to the tone generator 15 for piano tones, the tone generator for piano tones 15 produces a digital tone signal on the basis of the MIDI codes, and coverts the digital tone signal to an analog audio signal. The MIDI code generator 14 supplies the analog audio signal to the mixer 5. If the controller 3 has instructed the MIDI code generator 14 to send the MIDI codes thereto, the MIDI code generator 14 supplies the event codes D3 to the controller 3 in real time fashion.

The mixer 13 has signal input ports connected to the digital signal processor 2, controller 3 and tone generator for piano tones 15. The digital signal processor 2 supplies the analog audio signal, which has been produced from the audio data codes D1, to the mixer 5, and the tone generator for piano tones 15 supplies the analog audio signal, which have been produced from the event codes D3, to the mixer 5. The mixer 5 mixes those signals, and produces an analog audio signal. The mixer 5 supplies the analog audio signal to the amplifier 6. The analog audio signal is amplified, and is, thereafter, supplied to the speakers 7. The analog signal is converted to electronic tones through the speakers 7.

The floppy disc driver 8 has signal input/output ports connected to the signal output/input ports of the controller 3.

The most important task to be achieved by the floppy disc driver 8 is the synchronous recording for producing a standard MIDI file SMF. The disc identification code C-ID, music identification codes M-ID and MIDI codes MIDI are stored in the standard MIDI file SMF. FIG. 10 shows a typical example of the standard MIDI file SMF. The standard MIDI file SMF is broken down into a header chunk HT and a track chunk TT. Fundamental information such as a chunk type, the disc identification code C-ID and the music identification codes M-ID are stored in the header chunk HT. On the other hand, the track chunk TT is assigned to the MIDI codes MIDI representative of the pieces of music recorded in the floppy disc FD. A set of MIDI codes MIDI includes event codes representative of the system message such as a system exclusive event, metaevent and so forth as well as the event codes D3 supplied from the MIDI code generator 14. when the control signal representative of the initiation of synchronous recording reaches the floppy disc driver 8, the floppy disc driver 8 starts a clock. The floppy disc driver 8 produces an event code D3*a* representative of initiation of reading out the audio data codes at 250 milliseconds from the reception of the control signal, and stores the event code D3*a* into the track chunk TT. As will be described hereinafter in detail, the floppy disc driver 8 produces delta-time codes representative of time intervals between the events, and are also stored in the floppy disc FD as parts of the track chunk. The controller 3 may produce the event codes representative of the system message.

Another major task to be achieved by the floppy disc driver 8 to be achieved by the floppy disc driver 8 is to vary the time interval stored in each delta-time code D4. This means that the floppy disc controller 8 can vary the time interval between the event codes D3. In detail, while the user is fingering a piece of music on the keyboard, the controller 3 transfers the event codes D3 from the MIDI code generator 14 to the floppy disc driver 8. When an event code or a set of event codes D3 reaches the floppy disc driver 8, the floppy disc driver 8 checks the clock to see how long the even code or codes D3 are spaced from the previous event code or codes, and temporarily determines the time interval between the events. The floppy disc driver 8 checks the time code D2 transferred through the controller 3 to see whether or not the fingering on the keyboard is well synchronized with the reproduction of the compact disc CD. If the answer is given positive, the floppy disc driver 8 determines that the time interval is to be stored in the delta-time code D4, and writes the delta-time code D4 in the track chunk TT. On the other hand, if the answer is given negative, the floppy disc driver 8 varies the time interval, and write it in the delta-time code D4. Thus, the floppy disc driver 8 serves as a timing regulator.

Figure 11:
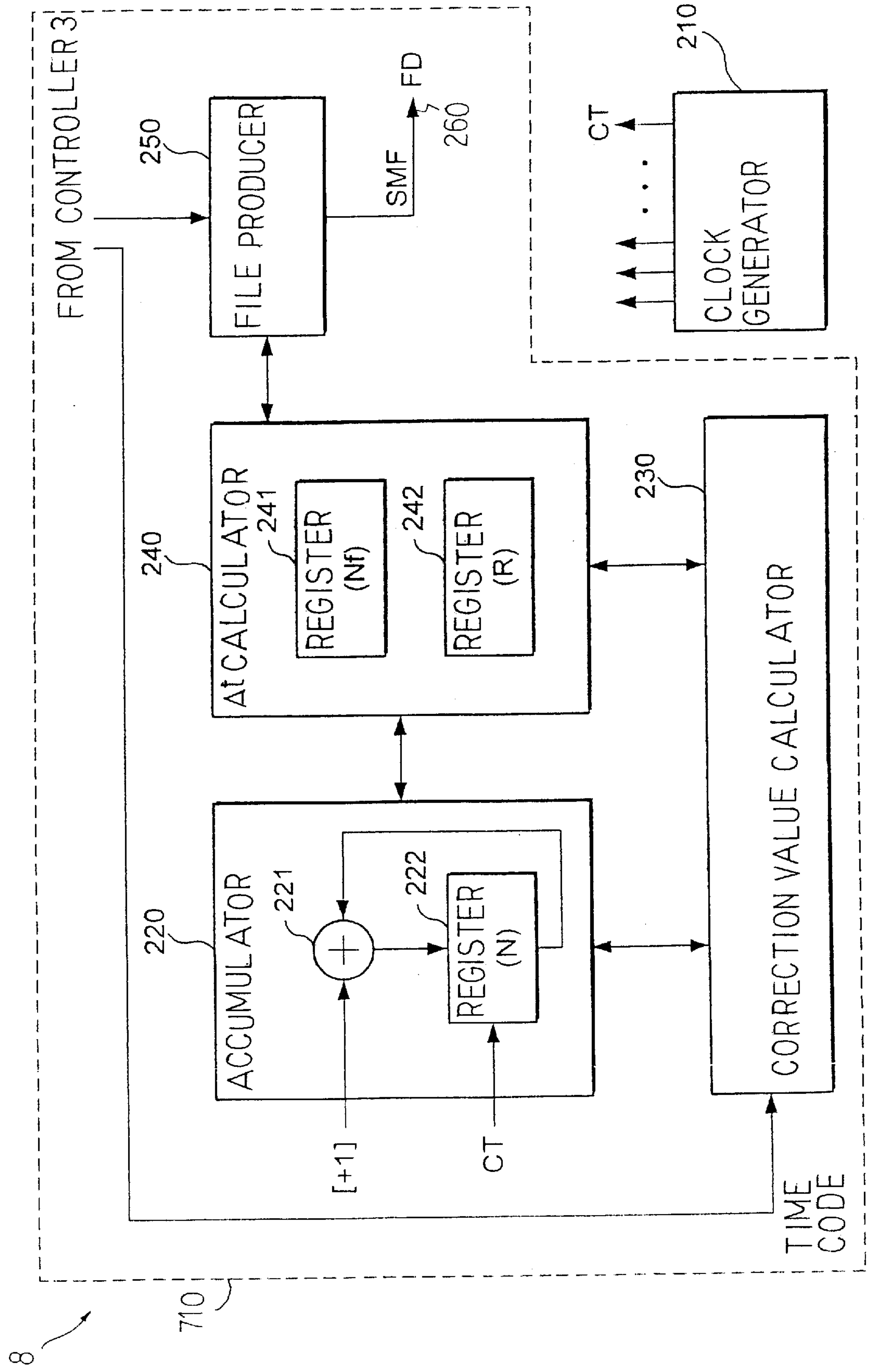
FIG. 11 is a block diagram showing the circuit configuration of a floppy disc driver incorporated in the music recorder/player.

Turning to FIG. 11 of the drawings, the floppy disc driver 8 includes a controller 710. The controller 710 defines the standard MIDI file SMF in a floppy disc FD, and records the above-described codes in the standard MIDI file SMF. Moreover, the controller 710 modifies the delta-time codes D4 depending upon the difference between the lapse of time measured by the clock and the time codes D2. A clock generator 210 is incorporated in the controller 3, and generates plural clock signals. One of the clock signals is a tempo clock CT, and the tempo clock CT is supplied to the controller 710 and the MIDI code generator 14. The MIDI code generator determines the time interval between the events on the basis of the tempo clocks CT.

The clock generator 210 includes quartz oscillator, an amplifier and frequency divider. The quartz oscillator generates an oscillation signal, and the oscillation signal is amplified by the amplifier. The amplified oscillation signal is supplied to the frequency divider, and the frequency divider produces the clock signals from the amplified oscillation signal. One of the clock signals is the tempo clock CT.

The controller 710 includes an accumulator 220 serving as the clock, a correction value calculator 230, a delta-time calculator 240 and a file producer 250. The controller 3 is connected to the file producer 250 and the correction value calculator 230, and supplies the event codes D3 and the delta-time codes D4 to the file producer 250 and the correction value calculator 230, respectively. The tempo clock CT is supplied from the clock generator 210 to the accumulator 220.

The accumulator 220 includes an adder 221 and a register 222. When the controller 3 receives the first time code representative of zero from the digital signal processor 2, and the controller 3 writes zero in the register 222, and transfers the time code to the correction value calculator 230. A source of contact [+1] is connected to one of the input nodes of the adder 221, and the register 222 is connected to the other input node of the adder 221. The total number N of tempo clocks is supplied to the adder 221, and the adder 221 increments the total number N of tempo clocks by one. The output node of the adder 221 is connected to the register 222, and the register 222 is responsive to the tempo clock CT for latching the output signal of the adder 221. The adder 221 and register 222 form an accumulating loop, and the total number N is incremented by one in response to the tempo clock signal CT. The total number N of tempo clocks is proportional to the lapse of time from 250 milliseconds after the initiation of synchronous recording. Thus, the accumulator serves as the clock.

The file producer 250 is under the control of the controller 3. The file producer 250 is connected to the delta-time calculator 240, and supplies an instruction signal representative of a calculation of delta time to the delta-time calculator 240 upon reception of an event code or a set of event codes so that the delta-time calculator 240 determines the delta time, i.e., the time interval between the previous event and the presently received event. The delta-time calculator 240 stores the delta-time in a delta-time code, and supplies the delta-time code to the file producer 250.

The file producer 250 is further connected through a driving circuit (not shown) to a write-in head 260. The controller 3 supplies the disc identification code C-ID and music identification codes M-ID to the file producer 250, and the file producer 250 writes the disc identification code C-ID and music identification codes M-ID through the write-in head 260 into the header chunk HT in the floppy disc FD. The file producer 250 produces an event code D3*a* representative of the initiation of reading out the audio codes from a compact disc CD. The file producer 250 produces the event code D3*a* 250 milliseconds after the reception of the control signal representative of the initiation of synchronous recording. While the user is fingering on the keyboard 11, the controller 3 intermittently transfers the event codes D3 from the MIDI code generator 14 to the file producer 250, and transfers other event codes to the file producer 250. When the event code or codes reach the file producer 250, the file producer 250 supplies the instruction signal to the delta-time calculator 240. The delta-time calculator 240 produces the delta-time code, and supplies it to the file producer 250 as described hereinbefore. The file producer 250 writes the event code D3*a*, event codes supplied from the controller 3 and delta-time codes into the track chunk in the floppy disc FD.

The delta-time calculator 240 is connected to the accumulator 220, correction value calculator 230 and file producer 250, and includes registers 241 and 242. When the control signal representative of the initiation of synchronous recording reaches the controller 710, the registers 241/242 are initialized, and zero is written in both registers 241 and 242. The time at which the delta-time calculator 240 received the instruction signal from the file producer 250 is stored in the register 241. The previously instructed time is stored in the register 241 as the number Nf of tempo clocks. When the instruction signal reaches the delta-time calculator 241, the delta-time calculator 240 reads out the number N of tempo clocks from the register 222, and calculates the time interval (N-Nf). The delta-time calculator 240 keeps the number N of tempo clocks in the register 241 as the previous instructed time Nf On the other hand, the other register 242 is assigned to a correction value R, which is also written in the form of the number of tempo clocks. The correction value R is representative of the difference between the clock, i.e., the accumulator 220 and the lapse of time determined on the basis of the time code D2. The correction value R is supplied from the correction value calculator 230, and the delta-time calculator 240 adds the correction value R to the time interval (N-Nf) for determining the delta-time, i.e., (N-Nf+R). The delta-time calculator 240 stores the delta-time in a delta-time code, and supplies the delta-time code to the file producer 250.

Figure 12:
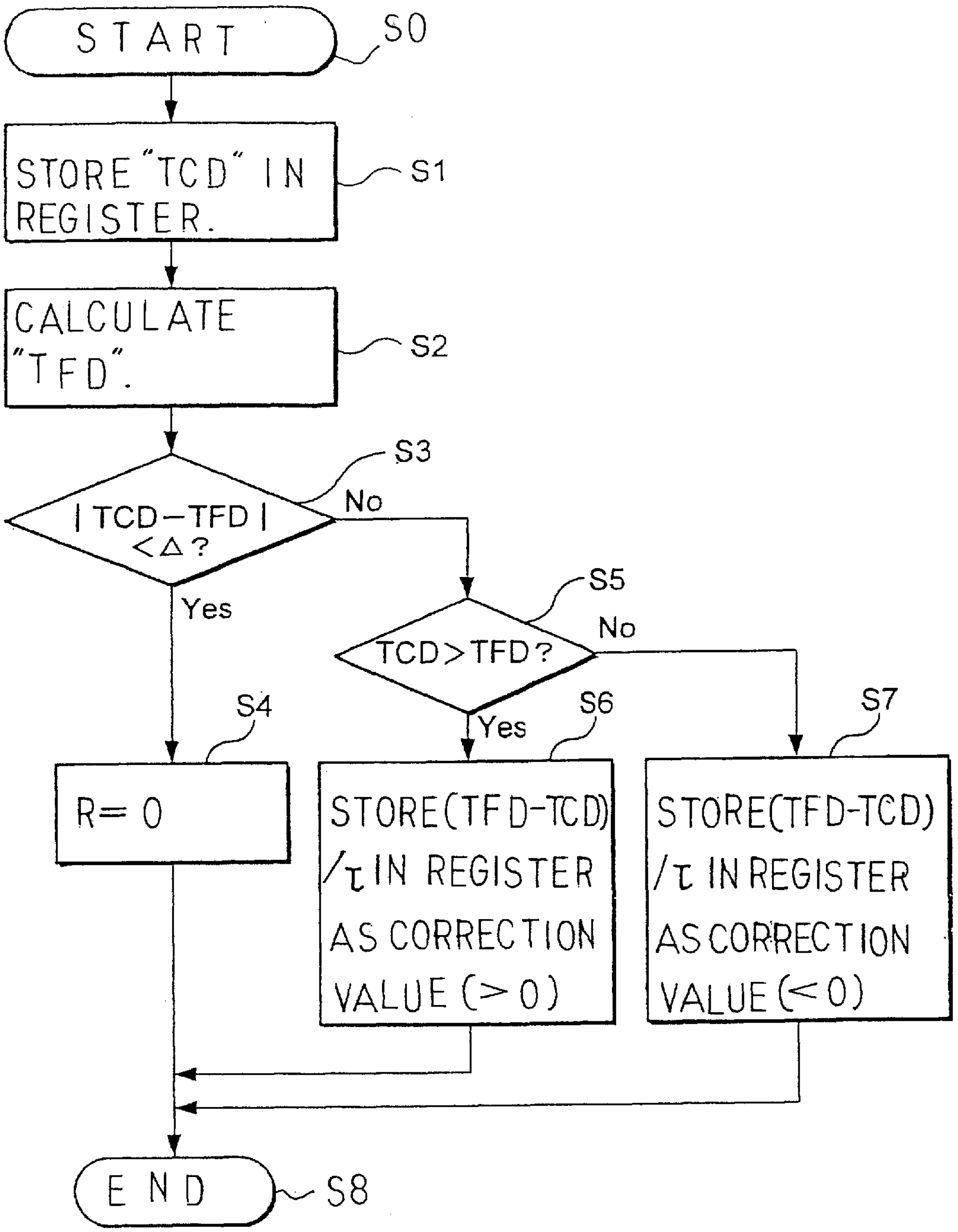
FIG. 12 is a flowchart showing a computer program executed by a correction value calculator incorporated in the floppy disc driver.

The correction value calculator 230 is connected to the accumulator 220 and delta-time calculator 240, and determines the correction value R. The correction value R is representative of the time difference between the part of a piece of music reproduced through the speakers 7 and another part of the piece of music produced through the electronic piano 10. The correction value calculator 230 determines the correction value R through execution of a computer program shown in FIG. 12.

A time code D2 is assumed to reach the correction value calculator 230. The correction value calculator 230 starts the computer program at step S0, and stores the time code D2 in an internal register (not shown). The time code D2 stores the lapse of time TCD from initiation of reading out the audio codes as by step S1.

Subsequently, the correction value calculator 230 reads out the number N of tempo clocks from the register 222, and converts the number N to a lapse of time TFD as by step S2. The tempo clocks CT have a pulse period $\tau$, and the lapse of time TFD is given as ($N\times\tau$).

The correction value calculator 240 determines the absolute value of the difference between the lapse of time TCD and the lapse of time TFD, and compares the absolute value |TCD−TFD| with a margin $\Delta$ to see whether or not the absolute value |TCD−TFD| is less than the margin $\Delta$ as by step S3. When the absolute value |TCD−TFD| is less than the margin $\Delta$, the answer at step S3 is given affirmative, and the correction value calculator 230 determines that the correction value R is to be zero. Then, the correction value calculator 230 writes zero in the register 242 as by step S4, and exits from the computer program.

On the other hand, the absolute value |TCD−TFD| is greater than the margin $\Delta$, the answer at step S3 is given negative, and the correction value calculator 230 checks the lapses of time TCD and TFD to see whether the part produced through the electronic piano 10 is delayed for the part reproduced through the speakers 7 as by step S5.

The part produced through the electronic piano 10 is assumed to be delayed for the part reproduced through the speakers 7. The lapse of time TCD is greater than the lapse of time TFD, and the answer at step S5 is given affirmative. Then, the correction value calculator 230 divides the difference TFD−TCD, which is a negative value, by the pulse period $\tau$, and writes the product, i.e., (TCD−TFD)/$\tau$ in the register 242 as the correction value R. Since the dividend (TCD−TFD) and the divisor $\tau$ are a negative value and a positive value, the product (TCD−TFD)/$\tau$ is negative. The correction value calculator 230 writes the correction value (>0) in the register 242 as by step S6. When the delta-time calculator 240 adds the correction value R to the time interval (N-Nf) for determining the delta-time, i.e., (N-Nf+R), the time interval (N-Nf) is shortened, and the delta-time code makes the next note-on event catches up with the tone produced through the speakers 7.

If, on the other hand, the part produced through the electronic piano 10 is advanced from the part reproduced through the speakers 7, the answer at step S5 is given negative, and the correction value calculator 230 divides the difference TFD−TCD, which is a positive value, by the pulse period $\tau$, and writes the product, i.e., (TCD−TFD)/$\tau$ in the register 242 as the correction value R. Since the dividend (TCD−TFD) and the divisor $\tau$ are positive, the product (TCD−TFD)/$\tau$ is a positive number. The correction value calculator 230 writes the correction value (<0) in the register 242 as by step S7

When the delta-time calculator 240 adds the correction value R to the time interval (N-Nf) for determining the delta-time, i.e., (N-Nf+R), the time interval (N-Nf) is prolonged, and the delta-time code makes the tone produced through the speakers 7 catch up with the next note-on event.

When the correction value calculator 230 writes the correction value at step S6 or S7, the correction value calculator 230 terminates the task at step S8.

Figure 13:
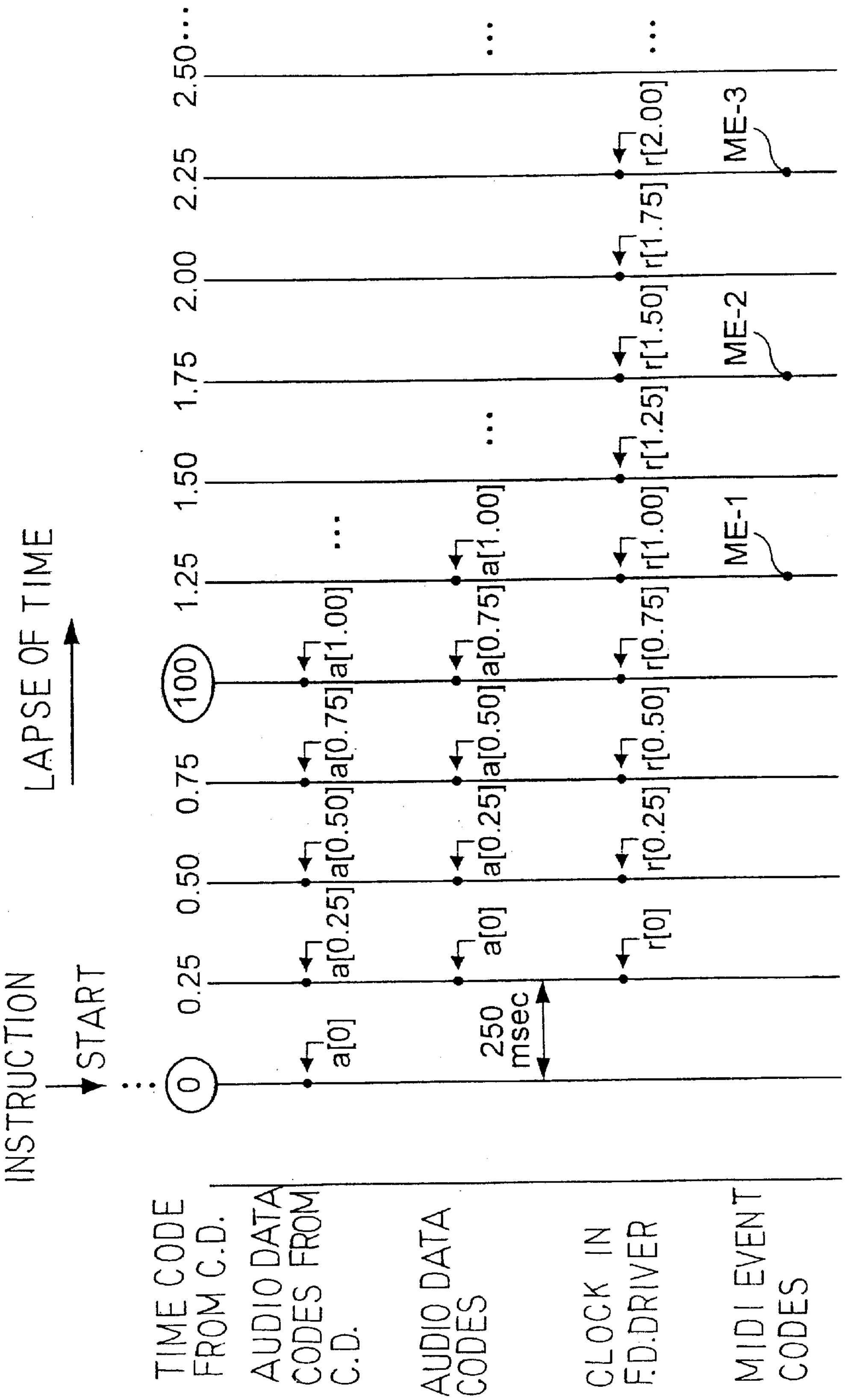
FIG. 13 is a timing chart showing a synchronous recording through the music recorder/player.
Figure 14:
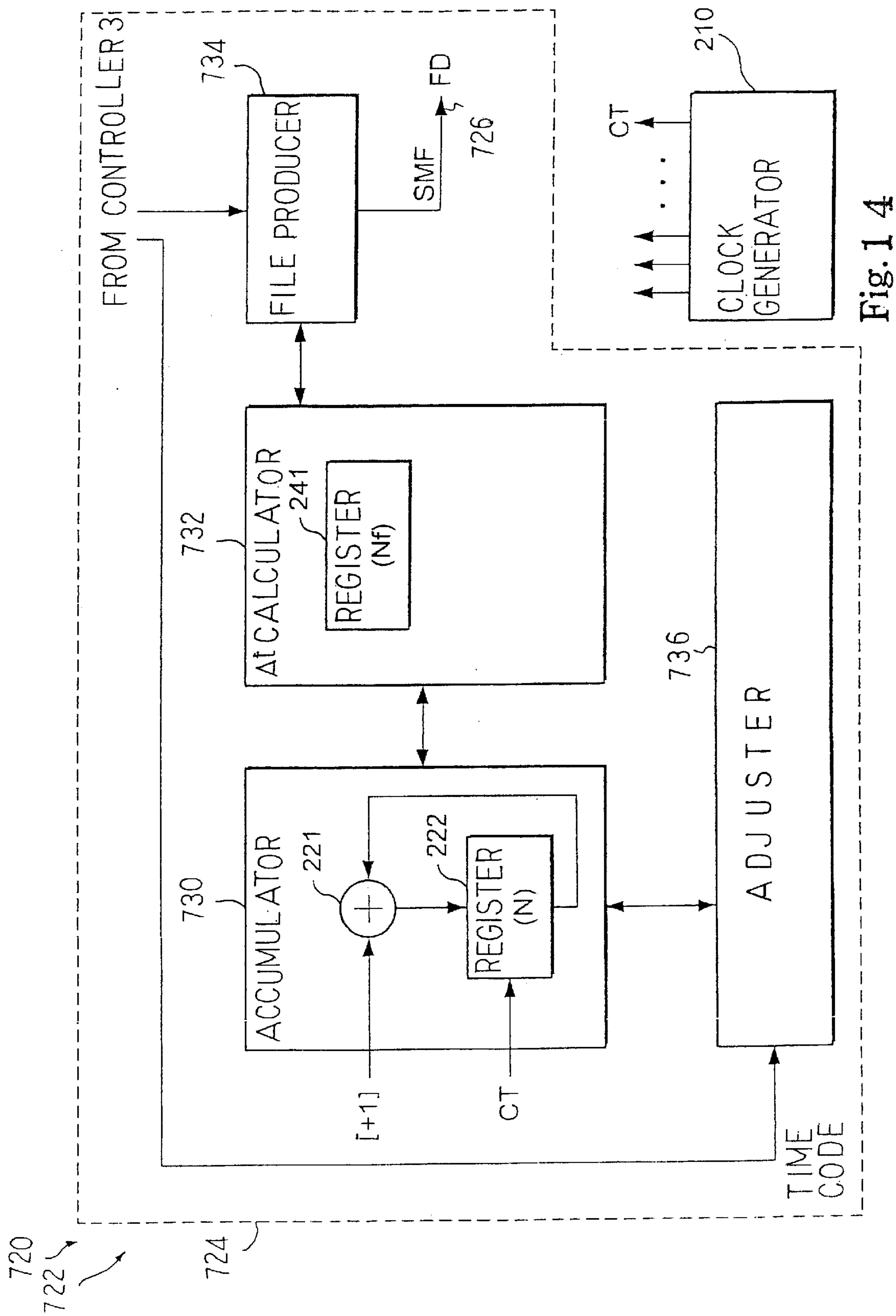
FIG. 14 is a block diagram showing the circuit configuration of a floppy disc driver incorporated in another music recorder player.

Description is hereinafter made on the synchronous recording with reference to FIG. 13. The time codes read out from the compact disc CD are illustrated in the first row, and the time codes [0], [0.25], [0.50], . . . are read out at time zero, 0.25 second, 0.50 second, . . . . Thus, the time codes [k] (k=0, 0.25, 0.50, . . . ) are read out at intervals of 0.25 second, i.e., 250 milliseconds. The audio data codes read out from the compact disc CD are expressed as a[0], a[0.25], a[0.50], . . . , and the audio data codes a[k] (k=0, 0.25, 0.50, . . . ) are representative of the audio data codes read out between time [k] and time [k+1]. The audio data codes a[k] read out from the compact disc CD are illustrated in the second row of FIG. 13. The audio data codes a[k] are converted to the analog audio signal, and a[k] (k=0, 0.25, 0.50, . . . ) in the third row are representative of the audio data codes corresponding to the parts of the analog audio signal. The fourth row is assigned to the value stored in the register 222. The controller 710 writes zero in the register 250 milliseconds after the initiation of the synchronous recording. For this reason, r[0] takes place at 0.25 second after the instruction. The event codes ME-1, ME-2, ME-3, . . . are representative of the event codes supplied from the MIDI code generator 14 in response to the fingering on the keyboard.

Assuming now that a user instructs the music recorder/player to record his or her performance on the keyboard synchronously with the playback of a piece of music recorded in a compact disc CD. The user loads a floppy disc FD into the floppy disc driver 8. The user selects a compact disc CD, and specifies a piece of music to be reproduced. The controller 3 gives an instruction for preparation to the compact disc driver 1. The compact disc driver 1 reads out the disc identification code C-ID and the music identification code M-ID from the compact disc CD, and supplies them through the digital signal processor 2 to the controller 3. The controller 3 supplies the disc identification code C-ID and music identification code M-ID to the file producer 250. The file producer 250 writes pieces of control data information including the disc identification code C-ID and music identification code MID in the header chunk HT of the standard MIDI file SMF.

When the header chunk HT is completed, the music recorder/player gets ready for the synchronous recording, and informs the user of the ready state. The user instructs the controller 3 to start the synchronous recording through the manipulating panel 4. Then, the controller 3 gives the control signal representative of initiation of synchronous recording to the compact disc driver 1, and the control signal reaches the compact disc driver 1 at time [0]. The time code [0] and audio data codes a[0] are firstly read out from the compact disc CD in the time intervals between [k] and [k+1]. The digital signal processor 2 checks the received codes a[0] to see whether the received codes are the audio data codes. With the positive answer, the digital signal processor 2 supplies the control signal representative of the sort of received codes, i.e., the audio data codes without any MIDI code to the controller 3, and the controller 3 permits the digital signal processor 2 to continue the given tasks.

The digital signal processor 2 converts the audio data codes a[0] to an initial part of the analog audio signal, and supplies the initial part of the analog audio signal to the mixer 5 250 milliseconds after the reception of the audio data codes a[0]. The digital signal processor 2 also waits for 250 milliseconds after the reception of the time code [0]. When the delay time is expired, the digital signal processor 2 supplies the time code [0] to the controller 3. When the controller 3 receives the time code [0], the controller 3 produces the instruction signal for synchronous recording to the floppy disc driver 8, and writes r[0] into the register 222. The accumulator 220 immediately starts to increment the value stored in the register 222. The controller 3 concurrently transfers the time code [0] to the correction value calculator 230. The correction value calculator 230 checks the time code k[0] to see whether or not the lapse of time is equal to zero. The first time code k[0] stores zero, and the answer is given positive. The correction value calculator 230 ignores the first time code [0], and does not calculate the correction value R.

The compact disc driver 1 repeats the data read-out from the compact disc CD, introduction of the delay, production of the analog audio signal and transfer of the time code [k] to the controller 3. The analog audio signal is propagated from the mixer 5 through the amplifier 6 to the speakers 7, and electronic tones are produced through the speakers 7.

When the digital signal processor 3 transfers the time code [0.25] through the controller 3 to the correction value calculator 230, the correction value calculator 230 fetches the value N stored in the register 222, and determines the correction value R on the basis of the value N and the time code [0.25]. If the difference is greater than the margin Δ, the correction value calculator 230 writes the finite correction value R in the register 242. The compact disc driver 1 continuously reads out the audio data codes a[k], and intermittently reads out the time code [k] at intervals of 250 milliseconds. The floppy disc driver 1 supplies the audio data codes a[k] and time codes [k] to the digital signal processor 2, and the digital signal processor 2 repeats the above-described tasks. As a result, the electronic tones, which form a part of the piece of music, are produced through the speakers 7, and the correction value calculator rewrites the correction value R in the register 242, if necessary.

The user starts the fingering, and the MIDI code generator 14 supplies the event codes ME-1, ME-2, ME-3 through the controller 3 to the floppy disc driver 8 at [1.00], [1.50], [2.00], . . . . When the event codes ME-1, ME-2, ME-3 reaches the file producer 250, and the file producer 250 requests the delta-time calculator 240 to generate the delta-time codes. The delta-time calculator 240 determines the delta time, and supplies the delta-time codes representative of the interval between the event codes ME-1 and ME-2, ME-2 and ME-3, . . . to the file producer 250. The file producer 250 writes the event codes ME-1, ME-2, ME-3 and the delta-time codes into the track chunk TT of the standard MIDI file SMF by means of the write head 260.

As will be understood from the foregoing description, the floppy disc driver 8 internally produces the delta-time code independently of the actual time interval between the evens. The floppy disc driver 8 periodically checks the lapses of time stored in the accumulator 220 and the time codes to see whether or not the fingering is surely synchronized with the playback of the piece of music, and determines the amount of delay or advance. Thus, the delta-time codes are determined on the basis of the lapse of time stored in the series of time codes. For this reason, when the performance on the keyboard is reproduced synchronously with the compact disc CD, the performance is well ensembled with the playback of the piece of music.

Moreover, both channels, i.e., the right and left channels are available for the audio data codes and time codes. The stereophonic sound is reproduced through the speakers 7, and the ensemble between the reproduction of the performance and the playback is given with concert-hall presence.

If the user wants to playback his or her performance, the music recorder/player reproduces the performance from the MIDI codes stored in the floppy disc FD.

The MIDI codes are stored in the standard MIDI file SMF. If the user synchronously performed plural passages stored in different compact discs CD, the music recorder/player easily selects one of the compact discs CD for each passage by using the disc identification code C-ID stored in the header chunk HT.

In this instance, the electronic piano 11 and compact disc driver 1 serve as the first data source and second data source, respectively. The controller 3, clock generator 210, accumulator 220, correction value calculator 230 and delta-time calculator 240 as a whole constitute the controlling system. The file producer 250 and write head 260 form in combination the recording system.

Second Embodiment

Another music recorder/player embodying the present invention comprises two music data sources, a synchronous music recorder 720 and a music player as similar to those of the music recorder/player 700. The music data sources and music player are similar to those of the music recorder/player 700, and the synchronous music recorder 720 is similar to the synchronous music recorder 702 except a floppy disc driver 722. For this reason, description is hereinafter made on only the floppy disc driver 722. When we refer to the other components in the following description, they are accompanied with references designating the corresponding components of the music recorder/player 700.

The floppy disc driver 722 also has an information processing capability, and includes a controller 724 and a write head 726. The controller 724 is connected to the controller 3, and internally produces delta-time codes on the basis of the time codes. Event codes are supplied from the MIDI code generator 14 through the controller 3, and the event codes and delta-time codes are written in a floppy disc by means of the write head 726.

The controller 724 includes an accumulator 730, a delta-time calculator 732, a file producer 734 and an adjuster 736.

The file producer 734 is similar to the file producer 250, and no further description is hereinafter incorporated for avoiding repetition.

The accumulator 730 also comprises an adder 221 and a register 222, and increments the total number N of tempo clocks CT as similar to the accumulator 220. The total number N expresses the lapse of time from the initiation of synchronous recording. The difference between the accumulators 220 and 730 is that the adjuster 736 can rewrite the total number N of tempo clocks CT as will be hereinafter described in more detail.

The delta-time calculator 732 includes only one register 241, which is assigned to the total number Nf of the tempo clocks CT at which the previous event code or codes reached the file producer 734. The delta-time calculator 732 determines the difference between the total number N and the total number Nf, and stores the difference, i.e., the interval between the events, in the delta-time code. The delta-time calculator 732 supplies the delta-time code to the file producer 734.

When the time code is transferred from the controller 3, the adjuster 736 compares the lapse of time calculated on the basis of the total number N with the lapse of time stored in the time code to see whether or not the difference between the lapses of time is fallen within a predetermined margin Δ. If the difference is less than the margin Δ, the adjuster 736 does not carry out any adjustment work. On the other hand, if the difference is greater than the margin Δ, the adjuster 736 rewrites the total number N so as to eliminate the difference from between the lapses of time.

Figure 15:
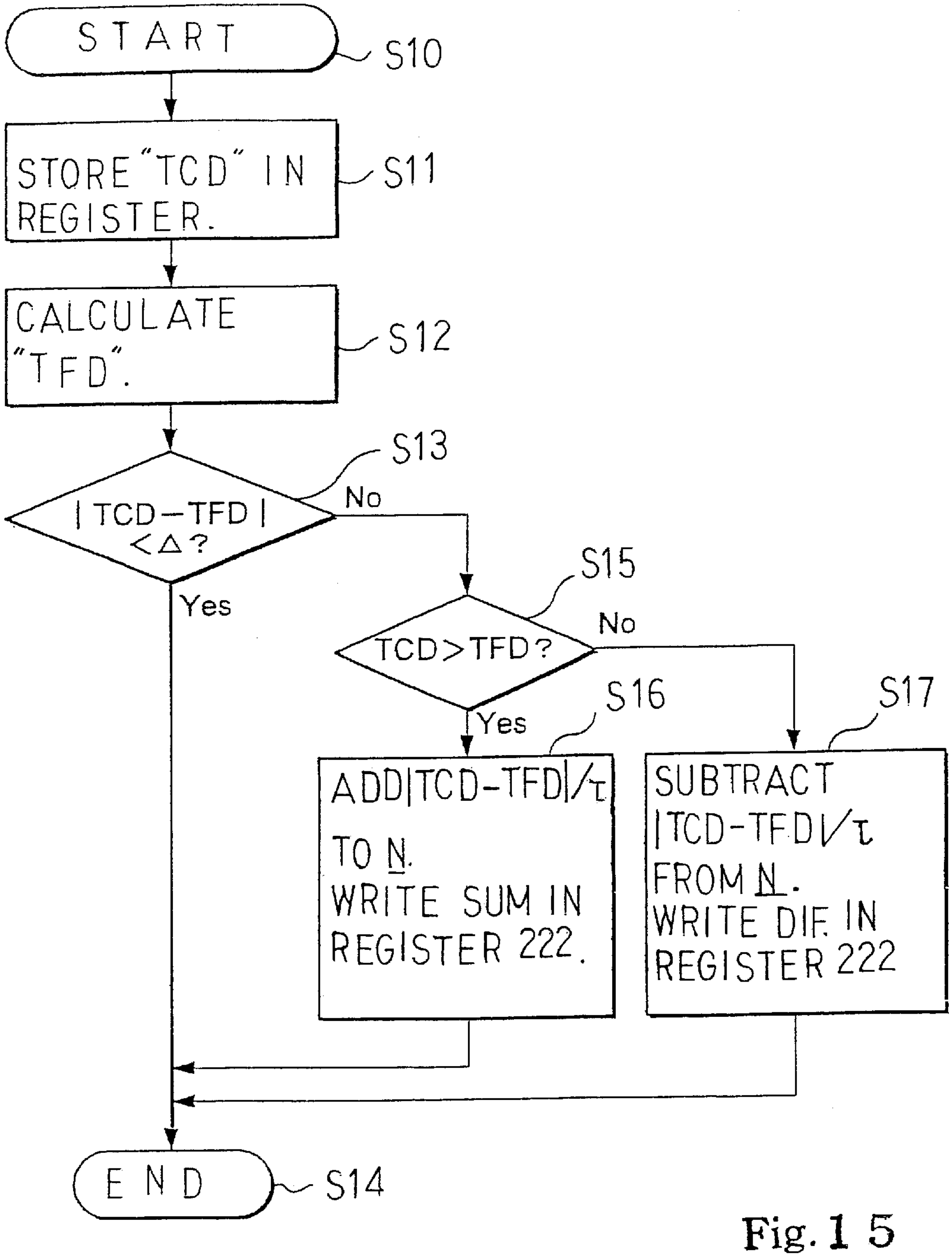
FIG. 15 is a flowchart showing a computer program executed by an adjuster incorporated in the floppy disc driver.

FIG. 15 illustrates a computer program to be executed by the adjuster 736. A time code D2 is assumed to reach the adjuster 736. The adjuster 736 starts the computer program at step S10, and stores the time code D2 in an internal register (not shown). The time code D2 stores the lapse of time TCD from initiation of reading out the audio codes as by step S11.

Subsequently, the adjuster 736 reads out the total number N of tempo clocks from the register 222, and converts the number N to a lapse of time TFD from the initiation of synchronous recording as by step S12. The tempo clocks CT have a pulse period τ, and the lapse of time TFD is given as (N×τ).

The adjuster 736 determines the absolute value of the difference between the lapse of time TCD and the lapse of time TFD, and compares the absolute value |TCD−TFD| with the margin Δ to see whether or not the absolute value |TCD−TFD| is less than the margin Δ as by step S13. When the absolute value |TCD−TFD| is less than the margin Δ, the answer at step S13 is given affirmative, and the adjuster 736 exits from the computer program as by step S14.

On the other hand, the absolute value |TCD−TFD| is greater than the margin Δ, the answer at step S13 is given negative, and the adjuster 736 compares the lapse of time TCD with the lapse of time TFD to see whether or not the internal clock, i.e., accumulator 730 is delayed for the time stored in the time code as by step S15.

The internal clock is assumed to be delayed for the lapse of time stored in the time code. The lapse of time TCD is greater than the lapse of time TFD, and the answer at step S15 is given affirmative. Then, the adjuster 736 divides the absolute value |TFD−TCD| by the pulse period τ, and add the product, i.e., |TCD−TFD|/τ to the total number N. The sum is written in the register 222 as by step S16. Thus, the internal clock is set with the time code. The adjuster 736 exits from the computer program at step S14.

If, on the other hand, the internal clock is advanced, the answer at step S15 is given negative, and the correction value calculator 230 divides the absolute value |TCD−TFD| by the pulse period τ, and subtracts the product, i.e., |TCD−TFD|/τ from the total number N. The adjuster 736 writes the difference (N−|TCD−TFD|/τ) in the register 222 as by step S17. Thus, the internal clock is set with the time code. The adjuster 736 exits from the computer program at step S14.

When a user instructs the controller 3 to record his or her performance synchronously with a piece of music stored in a compact disc CD, the music recorder/player internally produces the delta-time codes on the basis of the difference between the total numbers N and Nf, and stores the event codes and the delta-time codes in a standard MIDI file SMF. The adjuster 736 periodically checks the internal clock to see whether or not the lapse of time Nτ is approximately equal to the lapse of time stored in the time code. When the lapse of time Nτ is advanced or delayed, the adjuster sets the internal clock with the time code. As a result, the time interval stored in the delta-time code is based on the lapse of time stored in the time code, and the tones reproduced from the event codes are well ensembled with the stereophonic tones reproduced from the audio codes.

Third Embodiment

Figure 16:
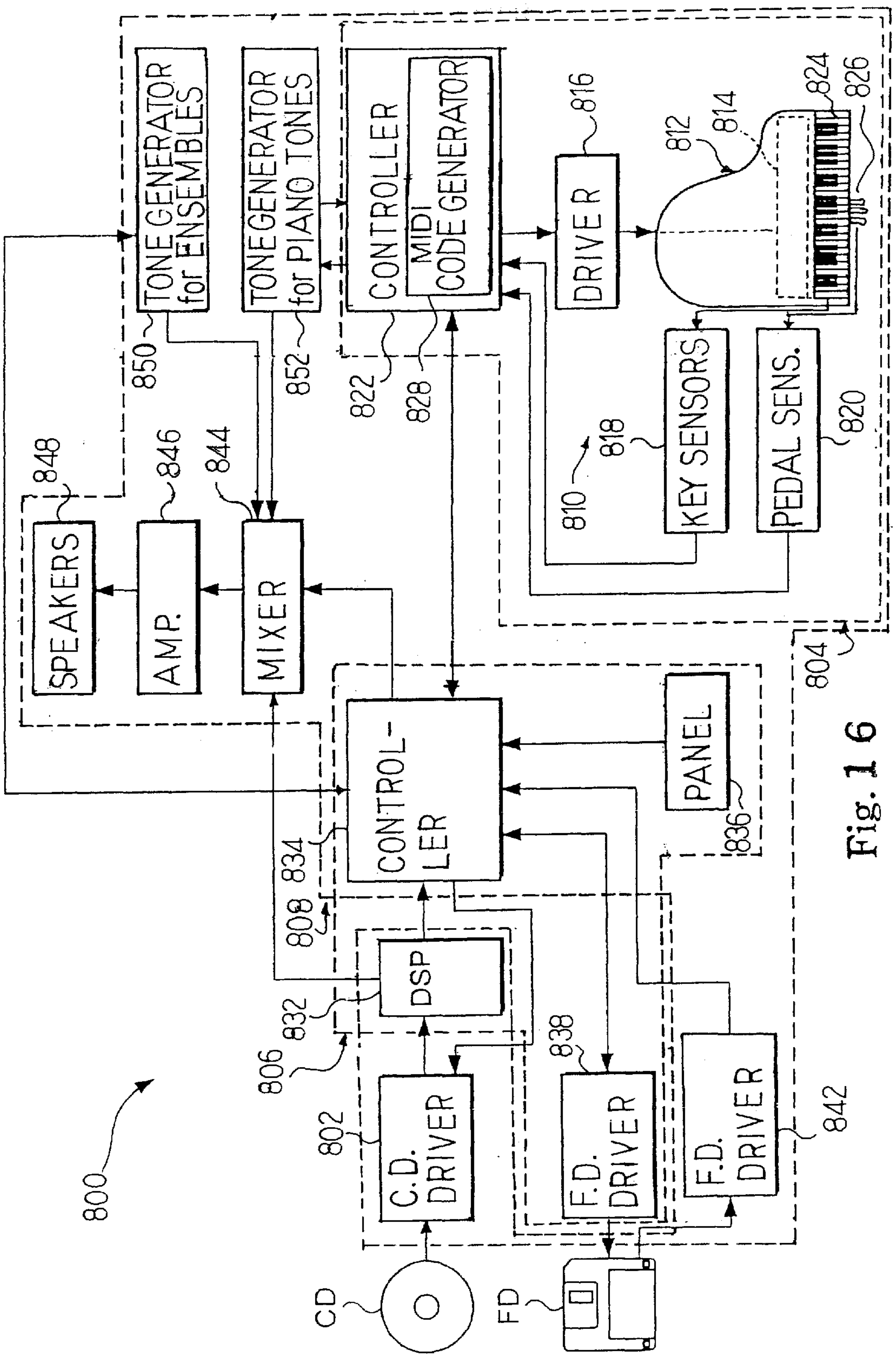
FIG. 16 is a block diagram showing the system configuration of a synchronous music recorder/player according to the present invention.

FIG. 16 shows yet another music recorder/player 800 embodying the present invention. The music recorder/player 800 largely comprises two music data sources 802/804, a synchronous music recorder 806 and a synchronous music player 808. In this instance, one of the music data sources 802 is a compact disc driver, and the other music data source 804 is implemented by an automatic player piano 810. The compact disc driver 802 has an information processing capability, and the automatic player piano 810 and compact disc driver 802 serves as not only the music data sources 802/804 but also parts of the synchronous music player 808.

The compact disc driver 802 and automatic player piano 810 are connected to the synchronous music recorder 806, and are further connected to the synchronous music player 808. While a user is fingering on the automatic player piano 810, the automatic player piano 810 generates a sort of music data codes, and supplies the sort of music data codes to the synchronous music recorder 806. Another sort of music data codes is supplied from the compact disc driver 802 to the synchronous music recorder 806. Although both sorts of music data codes require time codes, the time codes required for one sort of music data codes are different in meaning from the time codes forming parts of the other sort of music data codes. The synchronous music recorder 806 internally produces the time codes for one sort of music data codes on the basis of the time indicated by an internal clock, and stores them together with the music data codes of one sort in an information storage medium.

While the synchronous music recorder 806 is recording the music data codes and the internally produced time codes in the information storage medium, the synchronous music recorder 806 periodically checks the internal clock to see whether or not the time is substantially identical with the time stored in the time codes supplied form the compact disc driver 802. When the time is advanced from or delayed for the time stored in the corresponding time code, the synchronous music recorder 806 sets the internal clock with the corresponding time code. Thus, the synchronous music recorder 806 records the one sort of music data codes and the internally produced time codes in the information storage medium synchronously with the playback of the piece of music represented by the other sort of music data codes. The synchronous music recorder 806 behaves as similar to the synchronous music recorder 702.

When a user instructs the music player to play back an ensemble, the synchronous music player 808 starts to read out one sort of music data codes and time codes from an information storage medium and the other sort of music data codes and time codes from another information storage medium, independently. The synchronous music player 808 converts the time codes for one sort of music data codes to time codes identical in meaning with the time codes for the other sort of music data codes, and compares the time indicated by the converted time codes with the time indicated by the corresponding time codes to see whether or not both time codes are indicative of a same time. If the answer is given negative, the synchronous music player 808 rewrites the time stored in the time code for one sort of music data codes. As a result, the tones, which are reproduced on the basis of the music data codes of one sort, are reproduced synchronously with the tone reproduced on the basis of the music data codes of the other sort. In case where the music data codes of one sort and the music data codes of the other sort represent two different parts of a piece of music, the synchronous music player playbacks the piece of music as the ensemble.

The automatic player piano 810 includes acoustic piano 812, solenoid-operated key/pedal actuators 814, a solenoid driver 816, key sensors 818, pedal sensors 820 and a controller 822. In this instance, the acoustic piano 812 is implemented by a standard grand piano. An upright piano may serve as the acoustic piano 812. The acoustic piano 812 includes a keyboard 824 and pedals 826. A user specifies pitch names of tone to be produced through the keyboard 824, and prolongs and lessens the tones by stepping on the pedals 826.

The key sensors 818 are provided under the keyboard 824, and are connected to the controller 822. The key sensors 818 respectively monitor the associated black/white keys. When a user depresses a black/white key, the associated key sensor 818 produces a key position signal representative of a current key position on the trajectory of the depressed key, and supplies the key position signal to the controller 822. When the user releases the depressed key, the key sensor 818 notifies the controller 822 of the release through the key position signal.

The pedal sensors 820 are provided for the pedals 826, respectively, and are connected to the controller 822. The user is assumes to step on one of the pedals 826. The associated pedal sensor produces a pedal signal representative of a current pedal position on its trajectory, and supplies the pedal signal to the controller 822.

The controller 822 includes a MIDI code generator 828. The controller 822 periodically fetches pieces of key/pedal positional data stored in the key/pedal position signals, and stores them in a working memory (not shown). The controller 822 periodically checks the working memory to see whether or not the user depresses or steps on any one of the keys/pedals 824/826. In case where the user depresses a black/white key, a note-on event takes place. The controller 822 specifies the depressed key, and calculates a key velocity. The controller 822 informs the MIDI code generator 828 of the note number assigned the depressed key and the key velocity, and instructs the MIDI code generator 828 to produce event codes representative of the note-on event, note number and velocity. On the other hand, if the user releases the depressed key, a note-off event takes place. The controller 3 specifies the note number assigned to the released key, and instructs the MIDI code generator 828 to produce an event code representative of the key-off event and note number.

When the user steps on one of the pedals 826, a pedal-on event takes place. The controller 822 specifies the pedal, and determines the depth over which the pedal is sunk. The controller 822 instructs the MIDI code generator 828 to produce event code or codes. When the user releases the depressed pedal, a pedal-off event takes place, and the controller 822 instructs the MIDI code generator 828 to produce an event code. The MIDI code generator 828 further produces delta-time codes each representative of a time interval between an event and the previous event.

The solenoid-operated key/pedal actuators are provided for the black/white keys 824 and pedals 826, and move the associated keys/pedals. The controller 822 is connected to the driver circuit 816, and the driver circuit 816 is connected to the solenoid-operated key/pedal actuators 814. While the synchronous music player 806 is supplying event codes to the controller 822, the controller 822 analyzes the event codes, and determines black/white keys 824 and pedals 826 to be depressed or released. When the time for a note-on event comes, the controller 822 informs the driver circuit 816 of the note number assigned the black/white key to be depressed and the key velocity, and instructs the driver circuit 816 to energize the associated solenoid-operated key actuator 814 with a proper driving voltage signal. Then, the driver circuit supplies a driving voltage signal to the associated solenoid-operated key actuator 814, and the solenoid-operated key actuator 814 projects the plunger for moving the associated key. When the time for a note-off event comes, the controller 822 instructs the driver circuit 816 to remove the driving voltage signal from the associated solenoid-operated key actuator 814. Thus, the controller 822 instructs the driver circuit 816 selectively to supply the driving voltage signal to and remove it from the black/white keys and pedals 826. The black/white keys and pedals 826 are selectively moved for generating piano tones.

The synchronous music recorder 806 includes a digital signal processor 832, a controller 834, a manipulating panel 836 and a floppy disc driver 838. The digital signal processor 832, controller 836 and manipulating panel 838 are shared between the synchronous music recorder 806 and the synchronous music player 808. The digital signal processor 832, controller 834, manipulating panel 836 and floppy disc driver 838 behave as similar to those 2, 3, 4 and 8 incorporated in the synchronous music recorder 702. For this reason, no further description is hereinafter incorporated for the sake of simplicity.

As described hereinbefore, the automatic player piano 810 forms a part of the synchronous music player 808. The synchronous music player 808 further includes the compact disc driver 802, digital signal processor 832, controller 834 and manipulating panel 836, which are shared with the synchronous music recorder 806. The other components of the synchronous music player 808 are a floppy disc driver 842, a mixer 844, an amplifier 846, a speakers 848, a tone generator for ensembles 850 and a tone generator for piano tones 852. The floppy disc driver 842 has an information processing capability. Four sound sources are incorporated in the synchronous music player 808. The first sound source is the automatic player piano 810, i.e., acoustic piano 812, solenoid-operated key/pedal actuators 814, driver circuit 816 and controller 822. The digital signal processor 832, mixer 844, amplifier 846 and speakers 848 form in combination the second sound source, and the controller 834, tone generator for ensembles 850, mixer 844, amplifier 846 and speakers 848 as a whole constitute the third sound source. The fourth sound source is implemented by the combination of the controller 822, tone generator for piano tones 852, mixer 844, amplifier 846 and speakers 848. The tone generator for piano tones 852 or both tone generators 850/852 may form parts of the automatic player piano 852.

The tone generator for ensembles 850 produces a digital audio signal on the basis of the event codes. The event codes are supplied from the controller 834 to the tone generator for ensembles 850 so that the tone generator for ensembles 850 produces the digital audio signal on the basis of the event codes. The digital audio signal is fed back to the controller 834, and is converted to an analog audio signal. The analog audio signal is supplied to the mixer 844, and is amplified through the amplifier 846 before reaching the speakers. Since the mixer 844 has a digital signal port, the digital audio signal may be directly supplied from the tone generator for ensembles 850 to the mixer 844. The mixer 844 mixes all the pieces of music data supplied thereto in the form of digital and analog signals The controller 834 may be instructed to supply the event codes through the controller 822 to the tone generator for piano tones 852 or the driver circuit 816. The tone generator for piano tones 852 produces a digital audio signal on the basis of the event codes, and supplies the digital audio signal to the digital signal port of the mixer 844. The tone generator for piano tones 852 may have a digital-to-analog converting capability. In this instance, the tone generator 852 for piano tones supplies the mixer 844 an analog audio signal instead of the digital audio signal. Otherwise, the driver circuit 816 selectively supplies the driving voltage signal to the solenoid-operated key/pedal actuators 814, and the solenoid-operated key/pedal actuators 814 plays the acoustic piano 812.

The digital signal processor 832 produces an analog audio signal from the audio data codes, which are supplied from a compact disc through the compact disc driver 802, and supplies the analog audio signal to the mixer 844.

The sound source or sources to be used are instructed by a user through the manipulating panel 836. In case where the user selects the automatic player piano 810, the controller 834 transfers the event codes to the controller 822, and the controller 822 instructs the driver circuit 816 to energize the solenoid-operated key/pedal actuators 814 associated with selected ones of the black/white keys 824 for generating acoustic tones through vibrations of strings. The signal propagation and mechanical actions retard the acoustic tones. In this instance, 500 milliseconds are required for the signal propagation and mechanical actions. In order to produce the acoustic tones synchronously with the electronic tones produced through the speakers 848, the synchronous music player 808 introduces the delay of 500 milliseconds between the read-out of the audio data codes and the supply of the analog audio signal to the mixer 844. The sound source 832/844/846/848 produces the electronic tones immediately after the read-out of the audio data codes. This means that the delay of 500 milliseconds is required for an ensemble between the sound source 832/844/846/848 and the automatic player piano 810.

In this instance, the delay is introduced as follows. The compact disc driver 802 starts the data read-out 250 milliseconds after the floppy disc driver 842, and the digital signal processor 832 introduces delay of 250 milliseconds between the reception of audio data codes and the generation of the analog audio signal. Namely, half of the delay is introduced by the controller 834, and the other half is introduced by the digital signal processor 832.

The floppy disc driver 842 is responsive to a control signal for initiation of reading out MIDI codes so that the MIDI codes are intermittently supplied to the controller 834. When a delta-time code D4 is read out from a floppy disc FD, the floppy disc driver 842 stands idle for the time interval indicated by the delta-time code D4, and reads out the next event code or codes from the floppy disc FD. The floppy disc driver 842 repeats the idling and data read until the end of the piece of music. Thus, the floppy disc driver 842 behaves as a sequencer.

Figure 17:
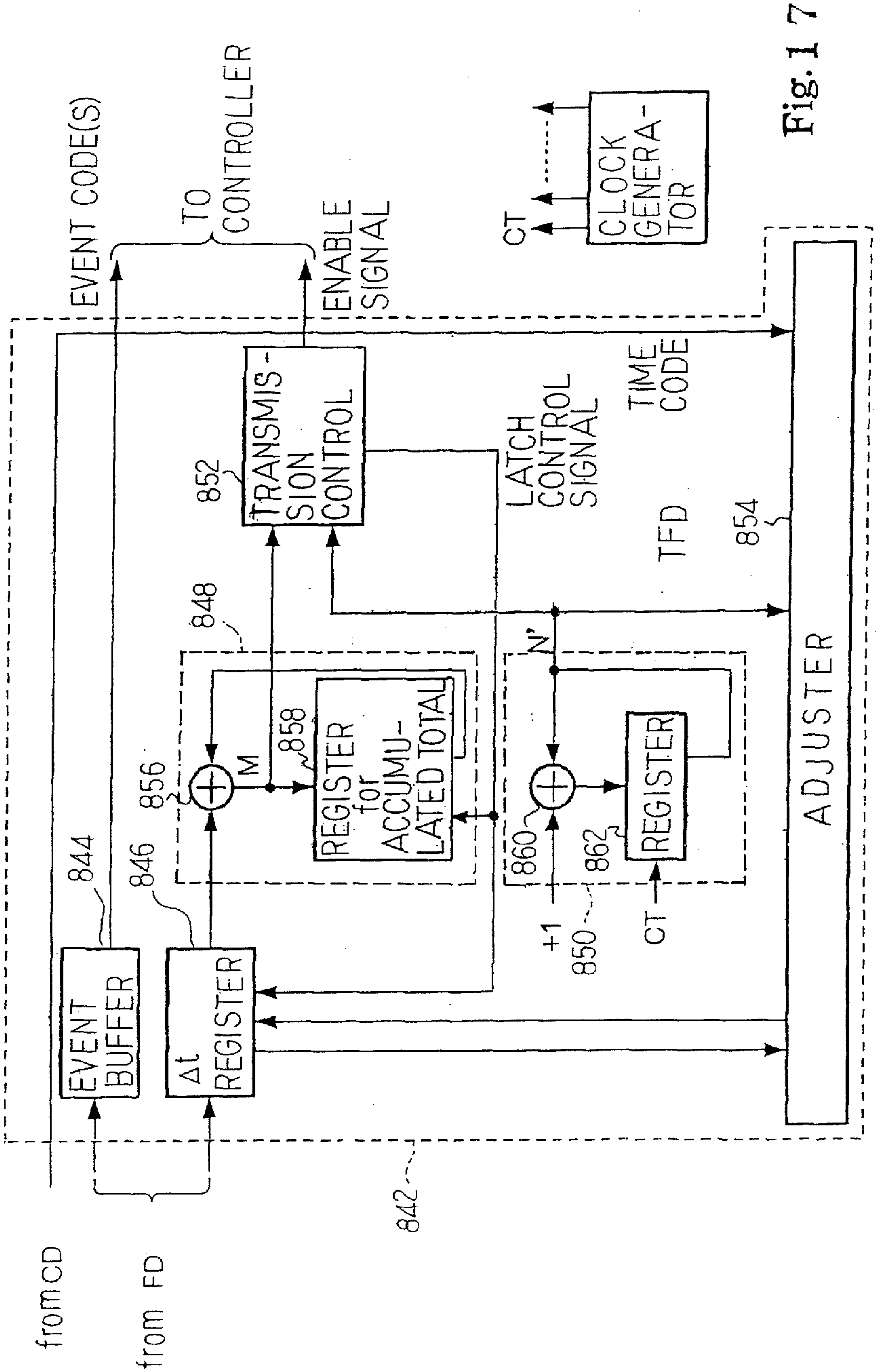
FIG. 17 is a block diagram showing the circuit configuration of a floppy disc driver incorporated in the synchronous music recorder/player.

The floppy disc driver 842 is further expected to serve as a timing regulator. FIG. 17 shows the circuit configuration of the floppy disc driver 842. The floppy disc driver 842 includes an event buffer 848, a delta-time register 846, accumulators 848/850, a transmission control 852 and an adjuster 854 for the function as the timing regulator. The accumulator 848 is implemented by a combination of an adder 856 and a register 858, and an adder 860 and a register 862 constitute the other accumulator 850.

The event code or codes D3 and the delta-time code D4 are selectively supplied from the floppy disc FD to the event buffer 844 and delta-time register 846, and are stored in the event buffer 844 and the delta-time register 846, respectively. A delta-time code D4 may be followed by more than one event code. The event buffer 844 has a memory capacity much engouh to store all the event codes. The value of the delta-time code D4 is equal to the number of tempo clocks CT to be counted between an event and the next event. The event buffer 844 is connected to a tri-state buffer of the controller 834, and the delta-time register 846 is connected to the accumulator 848 and the adjuster 854.

The transmission control 852 has two input ports connected to the accumulator 848 and the adjuster 854, and compare the accumulated total M, which represents a target time to transfer the event code or codes D3, with a number N' stored in the register 862 to see whether or not the event code or codes D3 are to be transferred to the controller 834. When the number N' reaches the accumulated total M, the answer is given affirmative, and the transmission control 852 changes the enable signal and a latch control signal to an active level, and supplies the active enable/latch control signals to the controller 834 and the delta-time register/register for accumulated total 846/858. The transmission control 852 may supply the delta-time register 846 and register 858 a write-in clock signal instead of the latch control signal.

The accumulator 848 accumulates the time intervals, i.e., the values of the delta-time codes D4, and supplies the accumulated total M to the transmission control 852. Each delta-time code D4 is representative of the number of tempo clocks CT to be counted between the event and the next event so that the accumulated total is also represented by the total number of tempo clocks counted from the initiation of reading out the MIDI codes. The adder 856 has to input ports respectively connected to the delta-time register 846 and the register for accumulated total 858, and the output port is connected to the register for accumulated total 858. Thus, the adder 856 and register 858 form an accumulating loop. When a user instructs the controller 834 to start a synchronous playback, the register 858 is reset to zero. While the floppy disc driver 842 is reading out the MIDI codes, the floppy disc FD intermittently supplies the delta-time codes D4 to the delta-time register 846. When the number N' reaches the accumulated total M, the transmission control 852 changes the latch control signal to the active level. With the active latch control signal, the next delta-time code D4 is stored in the delta-time register 846, and is immediately transferred to the adder 856 for accumulation. The adder 856 adds the delta time to the accumulated total M, and the new accumulated total M is stored in the register 858 in the presence of the latch control signal of the active level.

The other accumulator 850 counts the tempo clock CT. The adder 860 has two input ports respectively connected to a source of constant value "+1" and the register 862, and the output port of the adder 860 is connected to the register 862. The adder 860 and register 862 form an accumulating loop. The input port, at which the adder 860 is connected to the register 862, is further connected to the adjuster 854 and the transmission control 852, and the tempo clock CT is supplied to the register 862 as a latch control signal. When the user instructs the controller 834 to reproduce the ensemble, the register 862 is reset to zero. The adder 860 increments the number by one, and the total is stored in the register 862 in response to the tempo clock CT. Thus, the number N' of the tempo clocks CT is stored in the register 862, and is supplied to the adjuster 854 and the transmission control 852.

The adjuster 854 is connected to the controller 834, accumulator 850 and delta-time register 846. The time codes D2 are transferred from the compact disc CD through the digital signal processor 832 and controller 834 to the adjuster 854, and the accumulator 850 supplies the number N' of the accumulated tempo clocks CT to the adjuster 854. The adjuster 854 achieves two major tasks as follows.

The adjuster 854 firstly calculates a lapse of time from the initiation of reading out the MIDI codes by multiplying the number N' by the pulse period of the tempo clocks CT, i.e., $(N'\times\tau')$. As described hereinbefore, the audio data/time codes D1/D2 are 500 milliseconds delayed for the corresponding MIDI codes. In order to equalize the dial plate of one clock to the dial plate of the other clock, the adjuster 854 subtracts 500 milliseconds from the lapse of time $(N'\times\tau')$, and determines a lapse of time TFD' from the arrival of the first audio data code D1 at the controller 834, i.e., $\{(N'\times\tau')-500\}$.

The second task to be achieved by the adjuster 854 is to set the clock ahead or back. The lapse of time represented by the time code D2 is labeled with "TCD'". First, the adjuster 854 checks the time code D2 to see whether or not the lapse of time TCD' is greater than zero. While the answer is given negative, the adjuster 854 repeats it. When a time code D2 represents the lapse of time greater than zero, the answer is changed to affirmative. With the positive answer, the adjuster 854 compares the lapse of time TFD' with the lapse of time TCD' to see whether the lapse of time TCD' is greater than, equal to or less than the lapse of time TFD'. In case where the lapse of time TFD' is different from the lapse of time TCD', the adjuster 854 further checks the lapses of time TFD'/TCD' to see whether or not the difference DF is fallen within a predetermined margin MG. The adjuster 854 proceeds to different steps depending upon the answers as follows.

Case 1: TFD'=TCD' or |DF|<MG

The adjuster 854 sets the clock neither ahead nor back. The delta-time codes D4 are intermittently supplied from the floppy disc FD to the delta-time register 846, and are accumulated in the register 858. When the number N' of the total tempo clocks CT reaches the accumulated total M, the transmission control 852 changes the enable signal and latch control signal to the active level. With the enable signal of the active level, the event code or codes D3 are latched in the tri-state buffer of the controller 834, and the next delta-time code D4 is accumulated in the accumulator 846.

Case 2: TCD'>TFD' and |DF|>MG

The part reproduced through the automatic player piano 810 is delayed for the part produced through the speakers 848. The adjuster 854 converts the time lug, i.e., difference DF to the number DN of tempo clocks CT by dividing the difference DF by the pulse period τ'. The product $(TCD'-TFD')/\tau'$ is equivalent to the delay. The adjuster 854 fetches the delta-time code D4 from the delta-time register 846, and subtracts the number DN from the value ND4 of the delta-time code D4.

Subsequently, the adjuster 854 checks the calculation result to see whether or not the difference $\{ND4-(TCD'-TFD')/\tau'\}$ is a positive number. When the answer is given affirmative, the adjuster 854 writes the difference in the delta-time register 846. The time interval represented by the delta-time code D4 is shortened. The adjuster 854 supplies the delta-time code D4 to the register 846 so that the delta-time code D4 stored in the register 846 represents the number less than the previous number. When the delta-time code D4 is accumulated in the register 858, the transmission control 852 transmits the event code or codes D3 to the controller 834 earlier than the previous schedule. This results in that the delay is canceled. Both parts are synchronously reproduced through the automatic player piano 810 and speakers 848.

On the other hand, if the difference is a negative number, the answer is given negative. In this situation, the adjuster 241 divides the product $(TCD'-TFD')/\tau'$ by a positive number α, and subtracts the products $(TCD'-TFD')/\tau'\alpha$ from the value ND4 of the delta-time code. If the positive number is 2, the difference is given as $\{ND4-(TCD'-TFD')/2\tau'\}$. The adjuster 854 checks the calculation result to see whether or not the difference is a positive number. When the answer is given affirmative, the adjuster 854 writes the difference $\{ND4-(TCD'-TFD')/2\tau'\}$ in the delta-time register 846, and keeps the other half, i.e., $(TCD'-TFD')/2\tau'$ in an internal register (not shown). The adjuster 854 will subtract the other half from the value of the next delta time. Thus, the adjuster 854 stepwise takes up the time lug in order to make the two parts synchronous with one another. If the difference $\{ND4-(TCD'-TFD')/2\tau'\}$ is still given negative, the adjuster 854 increases the divisor, and repeats the above-described sequence.

Case 3: TCD'<TFD' and |DF|>MG

In this situation, the part reproduced through the automatic player piano 810 is advanced by the difference DF, i.e., TFD'−TCD' from the part reproduced through the speakers 848. The adjuster 854 firstly converts the time, i.e., difference DF to the number DN of tempo clocks CT by dividing the difference DF by the pulse period τ'. The product $(TFD'-TCD')/\tau'$ is equivalent to the time by which the part reproduced through the automatic player piano 810 is advanced. The adjuster 854 fetches the delta-time code D4 from the delta-time register 846, and adds the number DN to the value ND4 of the delta-time code D4. The adjuster 854 writes the difference $\{ND4+(TFD'-TCD'/\tau')$ in the delta-time register 846. Thus, the time interval represented by the delta-time code D4 is prolonged. The adjuster 854 supplies the delta-time code D4 to the register 846 so that the delta-time code D4 stored in the register 846 represents the number greater than the previous number. When the delta-time code D4 is accumulated in the register 858, the transmission control 852 retards the transmission of the event code or codes D3. This results in that both parts are synchronously reproduced through the automatic player piano 810 and speakers 848.

Assuming now that a user instructs the synchronous music player 808 to playback an ensemble through the second sound source 832/844/846/848 and the automatic player piano 810, the controller 834 supplies a control signal representative of the synchronous playback to the floppy disc driver 842. The floppy disc driver 842 starts to read out the MIDI codes from the floppy disc FD, and immediately supplies the MIDI codes to the controller 834. The event code D3*a* for initiation of reading out audio data codes reaches the controller 834 after 250 milliseconds from the initiation of reading out the MIDI codes, and the controller 834 instructs the compact disc driver 802 to start the read-out of the audio data codes and time codes with the control signal. Thus, a half of the delay is canceled by the controller 834.

The compact disc driver 802 reads out the audio data D1 codes and time codes D2 from the compact disc CD, and supplies the audio data codes D1 and time codes D2 to the digital signal processor 832. The digital signal processor 832 introduces the delay of 250 milliseconds between the reception of the audio data/time codes D1/D2 and the generation of the analog audio signal/transfer to the controller 834. Thus, the other half of the delay is canceled by the digital signal processor 832. The digital signal processor 832 analyzes the received codes to see whether or not they are the audio data codes D1. If the answer is given negative, the digital signal processor 832 informs the controller 834 that the received codes are not proper for generating the analog audio signal. The controller 834 gives a warning message to the user through the display window. When the answer is given affirmative, the digital signal processor 832 produces the analog audio signal from the audio data codes D1, and supplies the time codes D2 to the controller 834.

The controller 834 transfers the time codes D2 to the adjuster 854, and the adjuster 854 varies the number of tempo clocks CT stored in the time code D4, if necessary. Thus, the floppy disc driver 842 regulates the transfer of the event codes D3 to a proper timing at which the part is to be reproduced through the automatic player piano 810 synchronously with the part to be produced through the speakers 848.

The analog audio signal is supplied through the mixer 844 and the amplifier 846 to the speakers, and the electronic tones are generated through the speakers 848. On the other hand, the event codes D3 are transferred from the controller 834 to the controller 822, and the controller 834 determines trajectories to be traced by the plungers. The controller 834 instructs the driver circuit 816 to energize the solenoid-operated key/pedal actuators 814 associated with the selected ones of the black/white keys and pedals so that the solenoid-operated key/pedal actuators 814 moves the plunger along the trajectories, and the piano tones are generated through the acoustic piano 812.

Figure 18:
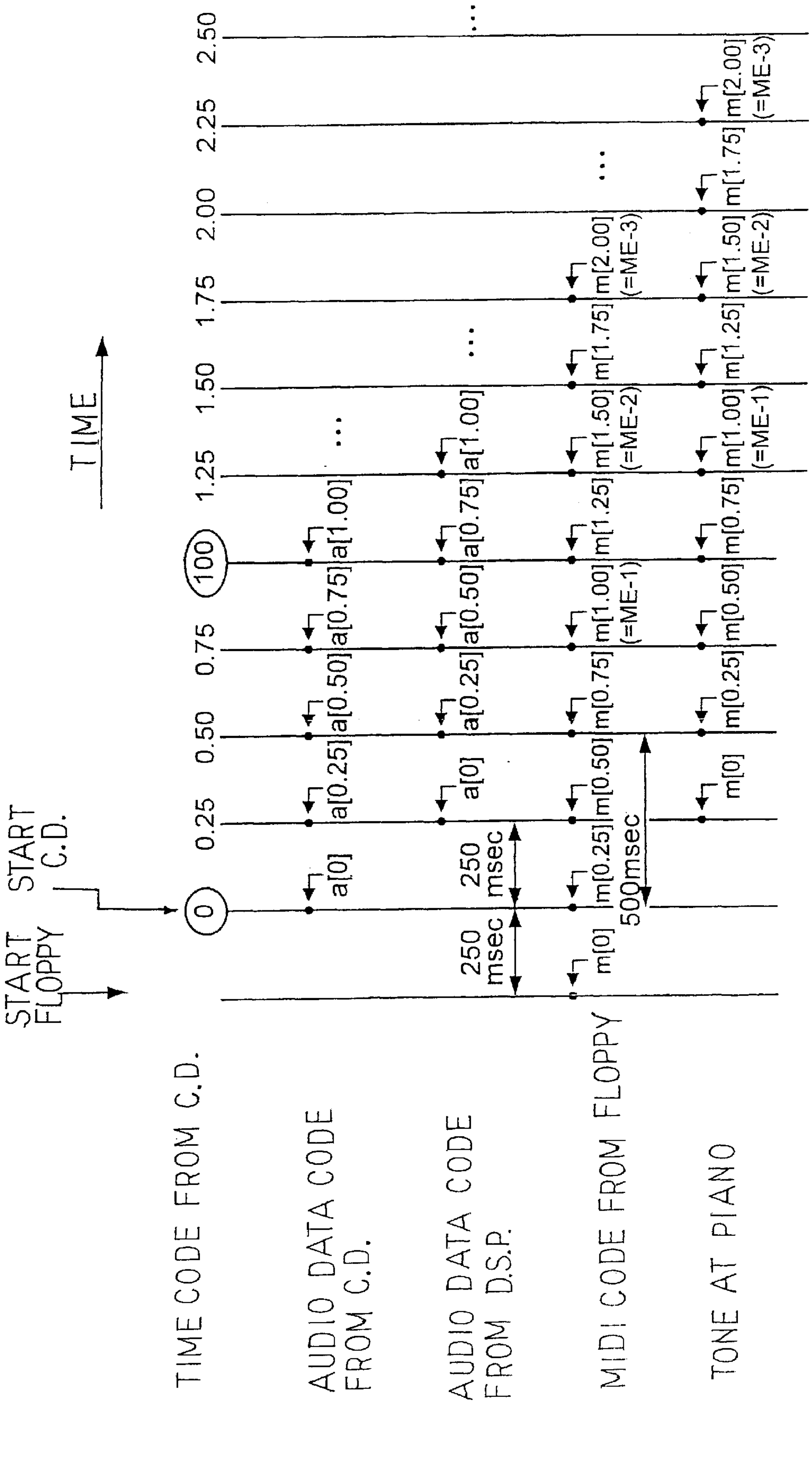
FIG. 18 is a timing chart showing a playback of an ensemble through the synchronous music recorder/player.

FIG. 18 illustrates playback of an ensemble. The user instructs the synchronous music player 808 to start a piece of music at the first tone or tones. The time codes D2 intermittently read out from a compact disc CD indicate a lapse of time, and the lapse of time is increased from 0 through 0.25, 0.50, 0.75, 1.00, 1.25 . . . as shown in the first row of FIG. 18. In other words, the time codes are inserted in the floppy disc at intervals of 250 milliseconds. The audio data codes read out from the compact disc are represented by a[k] (k=0, 0.25, 0.50, 0.75, 1.00, 1.25, . . . ), and are seen in the second row of FIG. 18. The lapse of time from the initiation of reading out the audio data codes is indicated by [k]. The audio data codes a[k] is read out from the compact disc CD from time [k] and time [k+1]. As described hereinbefore, the digital signal processor 832 produces the analog audio signal from the audio data codes a[k] after 250 milliseconds from the reception of the audio data codes a[k]. For this reason, the audio data codes a[k] in the third row are 250 milliseconds delayed for the audio data codes a[k] in the second row. The MIDI codes m[r] are 250 milliseconds advanced from the corresponding audio data codes a[k] as shown in the fourth row of FIG. 18. The lapse of time [r] from the initiation of reading out the MIDI codes is represented by N'τ, and the transfer of the MIDI codes ME-1, ME-2, ME-3 is scheduled at 1.00 second, 1.50 seconds and 2.00 seconds. In other words, m[1.00], m[1.50] and m[2.00] are identical with ME-1, ME-2 and ME-3. The automatic player piano 810 generates the piano tones on the basis of the event codes m[r], and the piano tones on the basis of the MIDI codes m(r) are delayed for the corresponding MIDI codes m(r) by 500 milliseconds as shown in the fifth row. Time [k] is 250 is milliseconds delayed for the corresponding time [r].

A user instructs the synchronous music player 808 to playback an ensemble through the second sound source 832/844/846/848 and the automatic player piano 810. The controller 834 supplies the control signal representative of the initiation of reading out the MIDI codes to the floppy disc driver 842. Then, the floppy disc driver 842 immediately starts to read out the MIDI codes from the floppy disc FD as labeled with “START FLOPPY” in FIG. 18, and the accumulator 850 starts to increment the number N' of tempo clocks CT. The MIDI codes m[0], m[0.25], m[0.50], . . . are read out from the floppy disc FD, and are transferred to the controller 834 at zero, 0.25 second, 0.50 second, . . . . The synchronous music player requires 500 milliseconds for the signal transfer and mechanical actions. For this reason, the first piano tone is generated at r=0.50 second, which is corresponding to k=0.25.

The compact disc driver 802 is still inactive, and any time code has not been read out from the compact disc CD. The adjuster 854 does not carry out the timing regulation.

After 250 milliseconds from the start, the event code D3*a* is transferred from the floppy disc driver 842 to the controller 834, and the controller 842 supplies the control signal representative of the initiation of reading out the audio codes to the compact disc driver 802. The compact disc driver 802 starts to read out the audio data codes and time codes as labeled with “START C.D.” in FIG. 18.

The audio data codes a[0] are read out from the compact disc CD between zero and 0.25 second, and are supplied to the digital signal processor 832. The digital signal processor does not produce the analog audio signal until expiry of 250 milliseconds, and checks the received codes to see whether or not they are audio data codes. With the positive answer, the digital signal processor 832 starts to produce the analog audio signal from the audio data codes, and supplies the analog audio signal through the mixer 844 and amplifier 846 to the speakers 848. The analog audio signal is converted to electronic tones through the speakers 848, and the first electronic tone is generated at k=0.25. Thus, the first electronic tone is generated concurrently with the first piano tone. The piano tones corresponding to the MIDI codes ME-1 and ME-2 are produced concurrently with the electronic tones corresponding to a[1.00] and a[2.00].

When the time code (0.25) is read out from the compact disc CD, the time code (0.25) is supplied to the digital signal processor 832, and the digital signal processor 832 introduces the delay of 250 milliseconds in the propagation from the compact disc driver 802 to the controller 834. The controller 834 transfers the time code (0.25) to the floppy disc driver 842, and the adjuster 854 starts the timing regulation as described hereinbefore. The adjuster 854 repeats the timing regulation whenever the time code reaches there. This means that the piano tones corresponding to the MIDI codes m[0], m[0.25], . . . are produced synchronously with the electronic tones corresponding to the audio data codes a[0], a[0.25], a[0.50], . . . .

As will be understood from the foregoing description, the synchronous music recorder/player according to the present invention internally produces the delta-time codes on the basis of the lapse of time Nτ periodically regulated with the lapse of time stored in the time codes D2, and records the event codes and the delta-time codes in an information storage medium. Furthermore, the synchronous music recorder/player reads out the MIDI codes and audio/time codes from the information storage medium and another information storage medium, and supplies the event codes and the audio signal to the sound source 832/844/846/848 and the sound source 810, respectively.

Although particular embodiments of the present invention have been shown and described, it will be apparent to those skilled in the art that various changes and modifications may be made without departing from the spirit and scope of the present invention.

Any sort of composite musical instrument is available for the music player. A silent violin, i.e., a combination of an acoustic violin and an electronic tone generating system is an example of the composite musical instrument. Another example is an electronic trumpet. A personal computer equipped with a sound generator may form a part of a music player, and a musical composition tool may be installed in the personal computer.

Although the delay of 250 milliseconds is proper to certain musical instruments, another musical instrument introduces a delay shorter than or longer than 250 milliseconds. For this reason, the delay of 250 milliseconds is variable depending upon the musical instrument. The digital signal processor introduces a delay proper to the musical instrument into the propagation of the audio/time codes.

The compact disc CD and floppy disc FD do not set any limit on the information storage medium. Any sort of volatile/non-volatile memory is available for the music player according to the present invention. An example of the non-volatile memory is a magneto-optical disc. A hard disc, CD-ROM, RAM and a removable memory such as a memory stick and smart memory are available for the music player and/or music reproducer according to the present invention. The audio codes D1 and time codes D2 may be stored in a floppy disc. The audio data codes/time codes D1/D2 and/or MIDI codes may be supplied from a data base through a private/public communication channel.

The music player may be combined with an automatic player piano in a factory. The manufacturer sells the combination as an automatic player for ensemble use.

A modification of the third embodiment may have a digital signal processor 3 between the mini disc driver 624 and the controller 4. In this instance, the digital signal processor introduces the delay into the propagation to the controller, and produces the analog audio signal from the audio data codes.

The electronic piano may be replaced with a silent piano, i.e., a combination between an acoustic piano, a hammer stopper and an electronic tone generation system. The music recorder/player according to the present invention may be separated into a music player and a music recorder each of which is sold and used independently.

The music recorder according to the present invention may be combined with any sort of composite musical instrument or an acoustic musical instrument equipped with sensors. An electronic stringed musical instrument, an electronic wind instrument and an electronic percussion instrument are examples of the composite musical instrument. When an acoustic stringed instrument is used, the sensors converts the vibrations of the strings to digital codes. Another sort of sensors may convert the vibrations of the air column to digital codes. Otherwise, the motion of manipulators such as pistons or keys may be converted to digital codes.

A personal computer system may serve as a source of MIDI codes. A user writes a music score on the display unit with the assistance of a suitable computer program, and the personal computer system expresses the passage in the form of MIDI codes. The MIDI codes are supplied from the personal computer system to the music recorder according to the present invention, and the passage is recorded in an external memory synchronously with the playback of a piece of music stored in a compact disc.

The synchronous music recorder according to the present invention may be installed in an electric piano 10 together with the other data source such as, for example, a compact disc driver 1 and the music player in the factory. The electric piano equipped with the synchronous music recorder, other data source and music player may be sold as an electric piano for ensemble.

Figure 19:
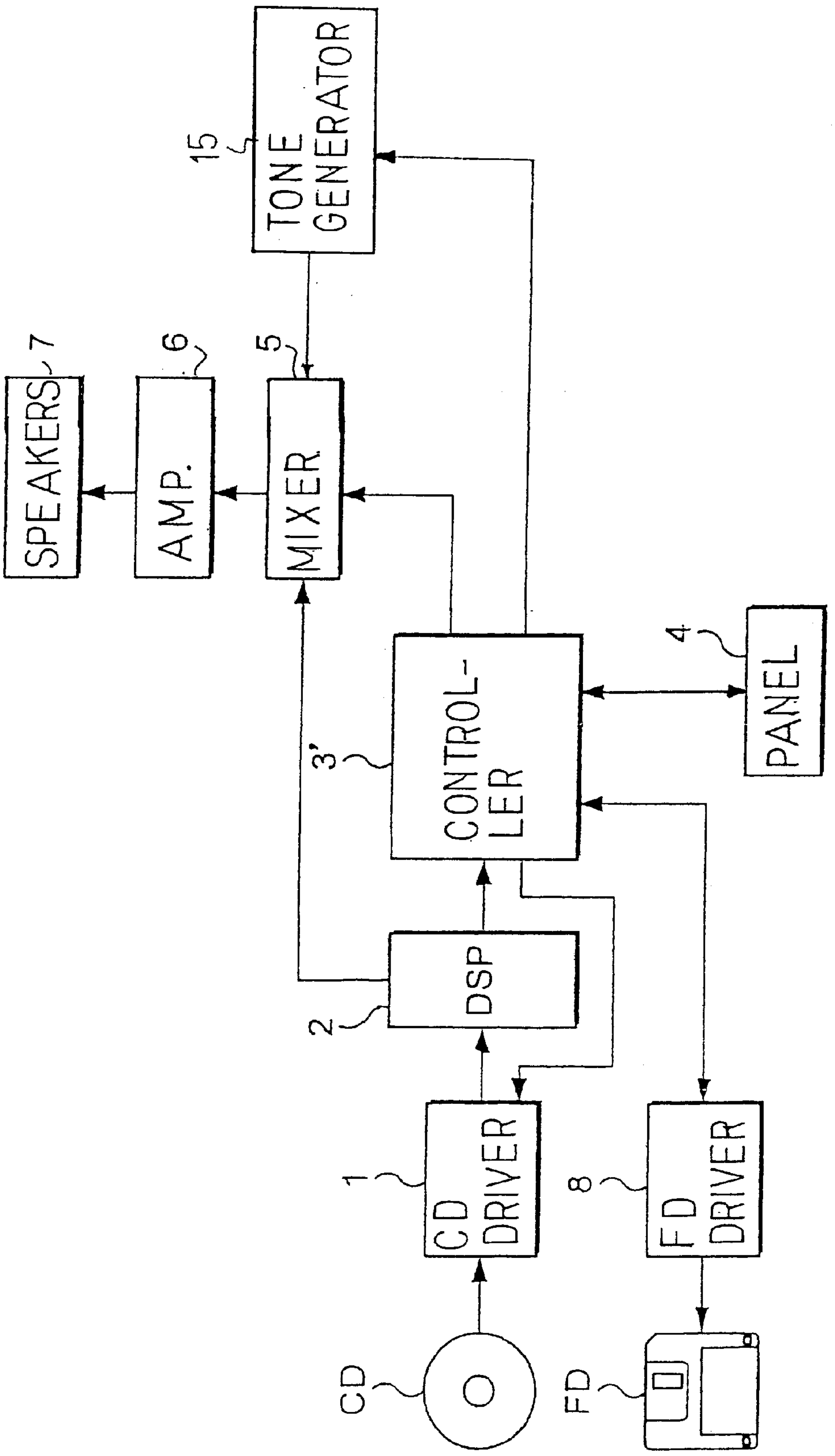
FIG. 19 is a block diagram showing a simple synchronous music player.

The event code D3*a* representative of initiation of reading out audio data codes is convenient to the ensemble between the automatic player piano and the sound source such as a digital signal processor and a sound system. However, the event code D3*a* is not an indispensable feature of the present invention. The delay of 500 milliseconds may be introduced by using a delay circuit inserted in the signal propagation path from the data source such as a compact disc driver and the speakers. A synchronous music player is shown in FIG. 19. The system components of the synchronous music player are labeled with the same references designating corresponding system components described hereinbefore. One of the differences is that MIDI codes are supplied from the controller 3' to the tone generator 15. The tone generator 15 converts the MIDI codes to a digital tone signal, which in turn is converted to an analog audio signal. Another difference is that the controller 3' independently supplies the control signals to the compact disc driver 1 and floppy disc driver 8. This means that the floppy disc FD does not store the event code D3*a* representative of initiation of reading out audio data codes. Yet another difference is that the delay time is variable from zero to a finite value. The digital signal processor 2 introduces delay of given value into the propagation of time data codes and conversion to an analog audio signal. In this instance, both electronic tones are produced through the speakers 9.

What is claimed is:

1. A music player for producing first sorts of sound and second sorts of sound synchronously with one another, comprising:

a first data source outputting a first sort of music data containing pieces of first music data information representative of first tones and pieces of first time data information each representative of a time interval between one of said pieces of first time data information and the next piece of first time data information;

a second data source outputting a second sort of music data containing pieces of second music data information representative of second tones and pieces of second time data information each representative of a lapse of time from a starting point;

a controlling system connected to said first data source and said second data source, producing a reference scale on which one of said lapse of time and said time interval is defined, said reference scale being identical in meaning with the other of said lapse of time and said time interval, said controlling system comparing said other of said lapse of time and said time interval with said reference scale to see whether or not a difference therebetween is ignoreable, varying said one of said lapse of time and said time interval or said reference scale when the answer is given negative, outputting the associated one of the piece of first music data information and the piece of said second music data information upon expiry of said one of said lapse of time and said time interval varied or unvaried after the comparison between said other of said lapse of time and said time interval and said reference scale, and further outputting the other of said piece of first music data information and said piece of second music data information;

a first sound source connected to said controlling system, and supplied with said pieces of first music data information for producing said first tones; and a second sound source connected to said controlling system, and supplied with said pieces of second music data information for producing said second tones.

2. The music player as set forth in claim 1, in which said reference scale is representative of a reference lapse of time from outputting a head of said first sort of music data so that said controlling means compares said lapse of time with said reference lapse of time.

3. The music player as set forth in claim 2, in which said first sort of music data is expressed by digital codes defined in the MIDI (Musical Instrument Digital Interface) standards so that said pieces of first music data information and said pieces of first time data information are stored in event codes and delta-time codes, respectively, and said second sort of music data is expressed by digital codes defined for a compact disc so that said pieces of second music data information and said pieces of second time data information are stored in audio data codes and time codes, respectively.

4. The music player as set forth in claim 3, in which said first sound source includes an acoustic musical instrument having plural manipulators for specifying pitches of said first tones and plural actuators for moving said manipulators without any fingering of a human player and a controller supplied with said event codes for selectively energizing said plural actuators.

5. The music player as set forth in claim 4, in which said acoustic musical instrument is a piano.

6. The music player as set forth in claim 3, in which one of said event codes is representative of initiation of outputting said audio data codes and said time codes so that said controlling system instructs said second data source to output said audio data codes and said time codes upon reception of said one of said event codes.

7. The music player as set forth in claim 6, in which said one of said event codes is stored at a position corresponding to a time interval so as to cancel a part of a time difference between a first time period consumed by each of said event codes until generation of associated one of said first tones and a second time period consumed by each of said audio data until generation of one of said second tones.

8. The music player as set forth in claim 3, in which said second sound source converts said audio data codes to an audio signal for generating said second tones from said audio signal.

9. The music player as set forth in claim 2, in which said controlling system includes a register connected to said first data source and responsive to a control signal so as to store each of said pieces of first time data information supplied from said first data source, a buffer connected to said first data source and storing the piece of first music data information between said each of said pieces of first time data information and the next piece of said pieces of first time data information, an accumulator connected to said register and responsive to a control signal so as to successively accumulate said pieces of first time data information for renewing a timing to transfer the piece of first music data information stored in said buffer, a clock connected to a source of periodical signal and incrementing said reference lapse of time with the periodical signal, an adjuster connected to said second data source, said clock and said register, supplied with said reference lapse of time and each of said pieces of second time data information to see whether or not a difference between said lapse of time and said reference lapse of time is ignoreable and varying a value indicated by said each of said pieces of first time data information when the answer is given negative, and a transmission control connected to said accumulator and said clock, comparing said reference lapse of time with said timing to see whether or not said reference lapse of time reaches said timing and transferring said piece of first music data information to said first sound source when the answer is given affirmative.

10. The music player as set forth in claim 9, in which said periodical signal is a clock signal with which said time intervals are defined.

11. The music player as set forth in claim 2, in which said in which said controlling system includes a register connected to said first data source and responsive to a control signal so as to store each of said pieces of first time data information supplied from said first data source, a buffer connected to said first data source and storing the piece of first music data information between said each of said pieces of first time data information and the next piece of said pieces of first time data information, an accumulator connected to said register and responsive to a control signal so as to successively accumulate said pieces of first time data information for renewing a timing to transfer the piece of first music data information stored in said buffer to said first sound source, a clock connected to a source of periodical signal and incrementing said reference lapse of time with said periodical signal, an adjuster connected to said second data source and said clock, supplied with said reference lapse of time and each of said pieces of second time data information to see whether or not a difference between said lapse of time and said reference lapse of time is ignoreable and varying said reference lapse of time when the answer is given negative, and a transmission control connected to said accumulator and said clock, comparing said reference lapse of time with said timing to see whether or not said reference lapse of time reaches said timing and transferring said piece of first music data information to said first sound source when the answer is given affirmative.

12. The music player as set forth in claim 11, in which said periodical signal is a clock signal with which said time intervals are defined.

13. A music recorder for recording a first sort of music data in an information storage medium, comprising:

a first data source outputting said first sort of music data containing pieces of first music data information representative of first tones, a time interval between each of said pieces of first music data information and the next piece of first music data information being to be defined in one of pieces of first time data information;

a second data source outputting a second sort of music data containing pieces of second music data information representative of second tones and pieces of second time data information each representative of a lapse of time from a starting point;

a controlling system connected to said first data source and said second data source, measuring a reference lapse of time on which the time intervals are to be defined, holding a value of said reference lapse of time when said each of the pieces of first music data information reached there, calculating said time interval when said next piece of first music data information reaches there, comparing said lapse of time with said reference lapse of time to see whether or not a difference therebetween is ignoreable, varying one of said reference lapse of time and said time interval so as to minimize said difference when the answer is given negative, and outputting said piece of first music data information and the associated piece of first time data information; and a recording system connected to said controlling system, and recording the pieces of first music data information and the associated pieces of first time data information in an information storage medium.

14. The music recorder as set forth in claim 13, in which said first sort of music data is expressed by digital codes defined in the MIDI (Musical Instrument Digital Interface) standards so that said pieces of first music data information and said pieces of first time data information are stored in event codes and delta-time codes, respectively, and said second sort of music data is expressed by digital codes defined for a compact disc so that said pieces of second music data information and said pieces of second time data information are stored in audio data codes and time codes, respectively.

15. The music recorder as set forth in claim 14, in which said first data source is selected from the group consisting of an electronic musical instrument and an acoustic musical instrument having plural manipulators for specifying pitches of said first tones and plural sensors for producing positional signals representative of current positions of said manipulators and a controller supplied with said positional signals for producing said event codes.

16. The music recorder as set forth in claim 15, in which said acoustic musical instrument is an automatic player piano.

17. The music recorder as set forth in claim 14, in which one of said event codes is representative of initiation of outputting said audio data codes and said time codes.

18. The music recorder as set forth in claim 17, in which said one of said event codes is stored at a position corresponding to a time interval so as to cancel a part of a time difference between sound sources used in a playback.

19. The music player as set forth in claim 13, in which said controlling system includes a file producer connected to said first data source and said recording system and supplying each of said pieces of first music data information and associated one of said pieces of first time data information to said recording system when said one of said pieces of first time data information reached, an accumulator connected to a source of periodic signal for measuring said reference lapse of time, a delta-time calculator connected to said accumulator and said file producer, having a register for storing a previous value of said reference lapse of time when a previous piece of first music data information reached and another register for storing, a correction value and calculating said associated one of said pieces of first time data information on the basis of said previous value of said reference lapse of time, a current value of said reference lapse of time presently stored in said accumulator and said correction value for supplying said associated one of said pieces of first time data information to said file producer, and a correction value calculator connected to said second data source, said accumulator and said delta-time calculator, comparing said current value of said reference lapse of time with a value of said lapse of time indicated by one of said pieces of second time data information arrived thereat to see whether or not a difference between said current value and said value of said lapse of time is ignoreable when said one of said pieces of second time data information reaches there and determining said correction value for supplying said correction value to said delta-time calculator when the answer is given negative.

20. The music recorder as set forth in claim 19, in which the periodical signal is a clock signal used for determining said time interval.

21. The music recorder as set forth in claim 13, in which said controlling system includes a file producer connected to said first data source and said recording system and supplying each of said pieces of first music data information and associated one of said pieces of first time data information to said recording system when said one of said pieces of first music data information reached, an accumulator connected to a source of periodic signal for measuring said reference lapse of time, a delta-time calculator connected to said accumulator and said file producer, having a register for storing a previous value of said reference lapse of time when a previous piece of first music data information reached and calculating said associated one of said pieces of first time data information on the basis of said previous value of said reference lapse of time and a current value of said reference lapse of time presently stored in said accumulator for supplying said associated one of said pieces of first time data information to said file producer, and an adjuster connected to said second data source and said accumulator, comparing said current value with a value of said lapse of time indicated by one of said pieces of second time data information just arrived thereat to see whether or not a difference between said current value and said value of said lapse of time is ignoreable when said one of said pieces of second time data information reaches there and varying the current value of said reference lapse of time when the answer is given negative.

22. The music recorder as set forth in claim 21, in which the periodical signal is a clock signal used for determining said time interval.

* * * * *